(12) United States Patent
Zhao et al.

(10) Patent No.: US 9,773,290 B2
(45) Date of Patent: Sep. 26, 2017

(54) CONTENT WATERMARKING

(71) Applicant: QUMU CORPORATION, Minneapolis, MN (US)

(72) Inventors: Xiwen Zhao, Minnetonka, MN (US); Priyadarshee Deeptarag Mathur, Chanhassen, MN (US)

(73) Assignee: QUMU CORPORATION, Minneapolis, MN (US)

( * ) Notice: Subject to any disclaimer, the term of this patent is extended or adjusted under 35 U.S.C. 154(b) by 0 days.

(21) Appl. No.: 15/005,929

(22) Filed: Jan. 25, 2016

(65) Prior Publication Data
US 2016/0155208 A1   Jun. 2, 2016

Related U.S. Application Data

(62) Division of application No. 13/840,107, filed on Mar. 15, 2013, now Pat. No. 9,245,310.

(51) Int. Cl.
*G06K 9/00* (2006.01)
*G06T 1/00* (2006.01)

(52) U.S. Cl.
CPC ............ *G06T 1/0085* (2013.01); *G06T 1/005* (2013.01); *G06T 2201/0051* (2013.01); *G06T 2201/0052* (2013.01)

(58) Field of Classification Search
None
See application file for complete search history.

(56) References Cited

U.S. PATENT DOCUMENTS

| | | | | |
|---|---|---|---|---|
| 5,862,260 A | * | 1/1999 | Rhoads | G06F 17/30876 382/232 |
| 6,185,312 B1 | * | 2/2001 | Nakamura | G06T 1/0057 283/113 |
| 6,373,974 B2 | * | 4/2002 | Zeng | G06T 1/0028 382/100 |
| 6,456,726 B1 | * | 9/2002 | Yu | G06T 1/0021 348/463 |
| 6,611,608 B1 | * | 8/2003 | Wu | G06T 1/0028 382/100 |

(Continued)

OTHER PUBLICATIONS

Pereira, S., et al., "Fast Robust Template Matching for Affine Resistant Image Watermarks", Proc. 3rd Int. Information Hiding Workshop, pp. 207-218,1999.*

(Continued)

*Primary Examiner* — Iman K Kholdebarin
(74) *Attorney, Agent, or Firm* — Maschoff Brennan

(57) ABSTRACT

In an embodiment, a method of decoding a watermarked video includes receiving a video including a watermark and three or more pilot signals. The method includes attempting to detect the watermark and retrieve a corresponding message in the video based on one or more decoding starting points of the video. The method includes outputting the message if the attempt is successful. If the attempt fails, the method includes detecting the pilot signals in the video; based on the detected pilot signals, estimating a geometric distortion of the video; inverting the geometric distortion for the video to generate a warped video; and attempting to detect the watermark and retrieve the corresponding message in the warped video based on one or more decoding starting points of the warped video.

20 Claims, 18 Drawing Sheets

(56) References Cited

U.S. PATENT DOCUMENTS

| | | | | |
|---|---|---|---|---|
| 6,792,129 | B1* | 9/2004 | Zeng | G06T 1/0028 382/100 |
| 7,376,264 | B2* | 5/2008 | Loce | H04N 1/4446 382/162 |
| 7,779,271 | B2 | 8/2010 | Langelaar | |
| 8,355,525 | B2* | 1/2013 | McKinley | G06F 17/30817 380/54 |
| 8,600,099 | B2* | 12/2013 | Asano | G06T 1/0071 382/100 |
| 2001/0037455 | A1* | 11/2001 | Lawandy | G06K 7/12 713/176 |
| 2002/0015508 | A1* | 2/2002 | Hannigan | G06T 1/0028 382/100 |
| 2002/0076084 | A1* | 6/2002 | Tian | G06T 1/0042 382/100 |
| 2002/0106103 | A1* | 8/2002 | Jones | G06T 1/0028 382/100 |
| 2003/0070075 | A1* | 4/2003 | Deguillaume | G06T 1/0042 713/176 |
| 2003/0179900 | A1* | 9/2003 | Tian | H04N 1/32144 382/100 |
| 2004/0017852 | A1* | 1/2004 | Garrido | H04N 7/0125 375/240.16 |
| 2004/0158724 | A1* | 8/2004 | Carr | B42D 25/00 713/186 |
| 2004/0230802 | A1* | 11/2004 | Moon | G06T 1/0028 713/176 |
| 2004/0258274 | A1* | 12/2004 | Brundage | G07D 7/128 382/100 |
| 2005/0002526 | A1* | 1/2005 | Choi | G10L 19/018 380/236 |
| 2005/0036613 | A1* | 2/2005 | Zhou | G06T 1/005 380/203 |
| 2005/0185819 | A1* | 8/2005 | Delp | G06T 1/0028 382/100 |
| 2005/0220321 | A1* | 10/2005 | Langelaar | G06T 1/0028 382/100 |
| 2005/0226461 | A1* | 10/2005 | Goldberg | G10L 19/018 382/100 |
| 2007/0071282 | A1* | 3/2007 | Isogai | G06T 1/0085 382/100 |
| 2007/0160260 | A1* | 7/2007 | Langelaar | G06T 1/0064 382/100 |
| 2007/0172094 | A1* | 7/2007 | Ho | G06T 1/005 382/100 |
| 2007/0172095 | A1* | 7/2007 | Isogai | G06T 1/0071 382/100 |
| 2008/0137749 | A1* | 6/2008 | Tian | G06T 1/0021 375/240.19 |
| 2008/0267520 | A1* | 10/2008 | Chen | G06T 1/0028 382/250 |
| 2009/0027558 | A1* | 1/2009 | Mantiuk | H04N 1/6027 348/673 |
| 2009/0110231 | A1* | 4/2009 | Rzeszewski | G06T 1/0028 382/100 |
| 2009/0220070 | A1* | 9/2009 | Picard | G06T 1/0028 380/28 |
| 2010/0034513 | A1* | 2/2010 | Nakano | G06T 1/0071 386/260 |
| 2010/0061585 | A1* | 3/2010 | Guo | G06T 1/005 382/100 |
| 2010/0260372 | A1* | 10/2010 | Ros | G06T 1/0064 382/100 |
| 2010/0322469 | A1* | 12/2010 | Sharma | G10L 19/018 382/100 |
| 2011/0164186 | A1* | 7/2011 | Sadek | H04H 20/33 348/724 |
| 2012/0163652 | A1* | 6/2012 | Xu | G06T 1/005 382/100 |
| 2013/0117571 | A1* | 5/2013 | Petrovic | H04L 9/00 713/176 |
| 2014/0270335 | A1* | 9/2014 | Larson | G06T 1/0021 382/100 |
| 2015/0029210 | A1* | 1/2015 | Daly | G09G 5/02 345/591 |

OTHER PUBLICATIONS

Bender, W., et al., "Techniques for data hiding", IBM Systems Journal, vol. 35, Nos. 3&4, 1996.

Chen, Brian, et al., "Quantization Index Modulation Methods for Digital Watermarking and Information Embedding of Multimedia", Journal of VLSI Signal Processing 27, 7-33, 2001.

Cox, Ingemar J., et al., "Secure Spread Spectrum Watermarking for Multimedia", IEEE Transactions on Image Processing, vol. 6, No. 12, Dec. 1997.

Kalker, Ton, etal., "Video watermarking system for broadcast monitoring", Proc. SPIE 3657, Security and Watermarking of Multimedia Contents, 103 (Apr. 9, 1999); doi:10.1117/12.344661.

Kim, Hying Shin, etal., "Invariant Image Watermark Using Zemike Moments", IEEE Transactions on Circuits and Systems for Video Technology, vol. 13, No. 8, Aug. 2003.

Kingsbury, N. G., "The dual-tree complex wavelet transform: a new technique for shift invariance and directional filters", Proc 8th IEEE DSP Workshop Utah, 1998.

Kutter, Martin, et al., "A Vision-Based Masking Model for Spread-Spectrum Image Watermarking", IEEE Transactions on Image Processing, vol. 11, No. 1, Jan. 2002.

Kutter, Martin, "Watermarking resistance to translation, rotation, and scaling", Proc. SPIE 3528, Multimedia Systems and Applications, 423 (Jan. 22, 1999); doi:10.1117/12.337432.

Laughton: http://www.libdmtx.org/, 2011.

Pereira, Shelby, et al., "Robust Template Matching for Mine Resistant Image Watermarks", IEEE Transactions on Image Processing, vol. 9, No. 6, Jun. 2000.

Podilchuk, Christine I., et al., "Image-Adaptive Watermarking Using Visual Models", IEEE Journal on Selected Areas in Communications, vol. 16, No. 4, May 1998.

Serdean, Cristian V., "Spectrum-based video watermarking algorithms for copyright protection," Thesis submitted to Universiry of Plymouth, Department of Communication and Electronic Engineering, 2002.

Solachidis, Vassilios, et al., "Circularly Symmetric Watermark Embedding in 2-D DFT Domain", IEEE Transactions on Image Processing, vol. 10, No. 11, Nov. 2001.

Wang, Guoxi, et al., "Modified Quantization Index Modulation Watermarking Adaptive to Contrast Masking Thresholds", Communications and Networking in China, 2006. ChinaCom '06. First International Conference on Date of Conference: Oct. 25-27, 2006.

Wei, Zhenyu, et al., "Spatio-Temporal Just Noticeable Distortion Profile for Grey Scale Image/Video in DCT Domain", IEEE Transactions on Circuits and Systems for Video Technology, vol. 19, No. 3, Mar. 2009.

Wolberg, G.., et al., "Robust image registration using log-polar transform," Image Processing, 2000. Proceedings. 2000 International Conference on , vol. 1, No., pp. 493,496 vol. 1, 2000, doi: 10.1109/ICIP.2000.901003.

Wolfgang, R.B.et al., "A watermark for digital images," Image Processing, 1996. Proceedings., International Conference on , vol. 3, No., pp. 219,222 vol. 3, Sep. 16-19, 1996, doi: 10.1109/ICIP.1996.560423.

Yang, Xiaokang, et al., "Motion-Compensated Residue Preprocessing in Video Coding Based on Just-Noticeable-Distortion Profile", IEEE Transactions on Circuits and Systems for Video Technology, vol. 15, No. 5, Jun. 2005.

Yao, Susu, et al., "Image Quality Assessment using Foveated Wavelet Error Sensitivity and Isotropic Contrast", Circuits and Systems, 2007. ISCAS 2007. IEEE International Symposium on , vol., No., pp. 2654,2657, May 27-30, 2007 doi: 10.1109/ISCAS.2007.377959.

(56) References Cited

OTHER PUBLICATIONS

Zeng, Wenjun, et al., Extraction of Multiresolution Watermark Images for Resolving Rightful Ownership, Proc. SPIE 3657, Security and Watermarking of Multimedia Contents, 404 (Apr. 9, 1999); doi:10.1117/12.34469.

* cited by examiner

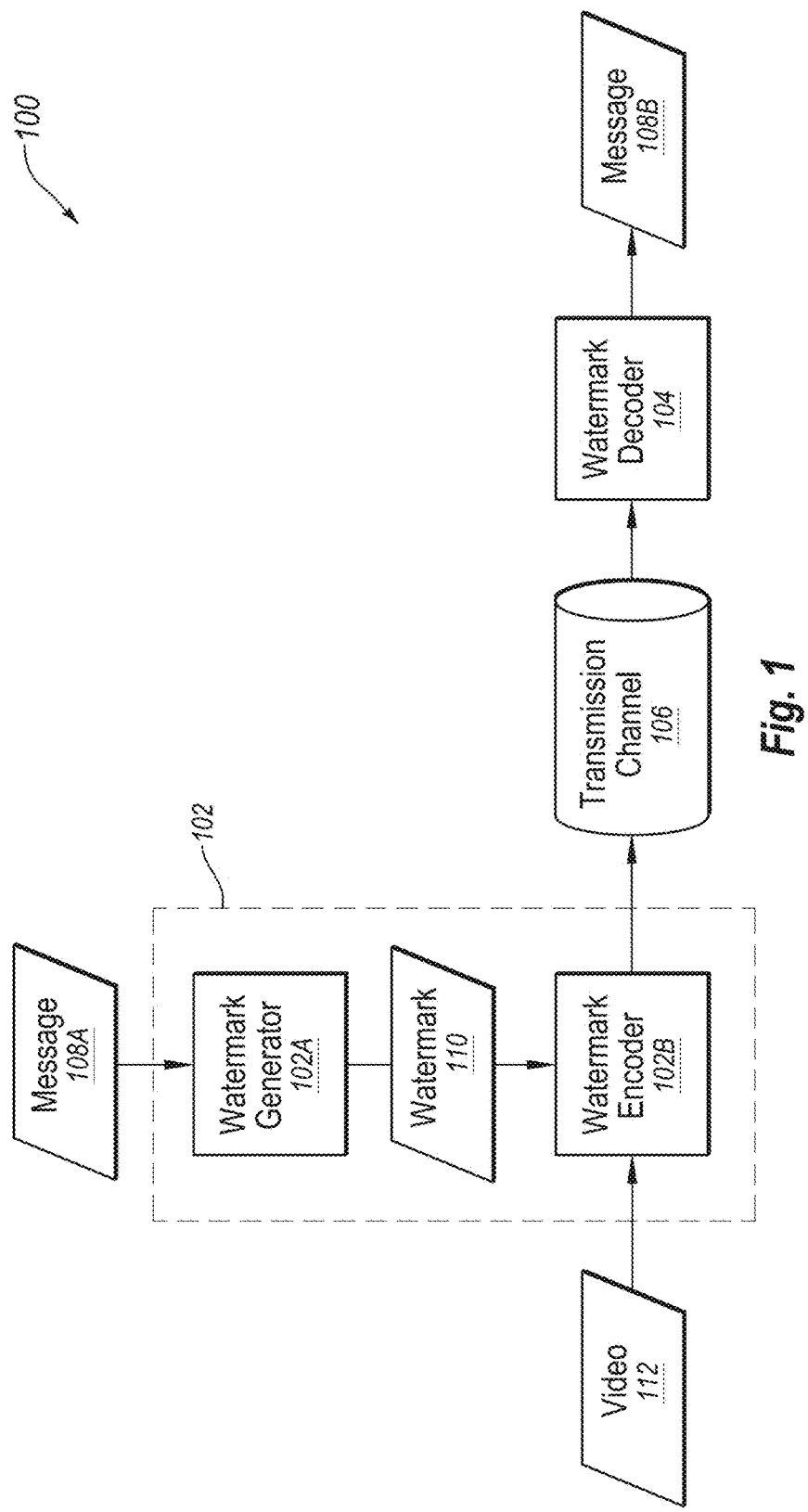

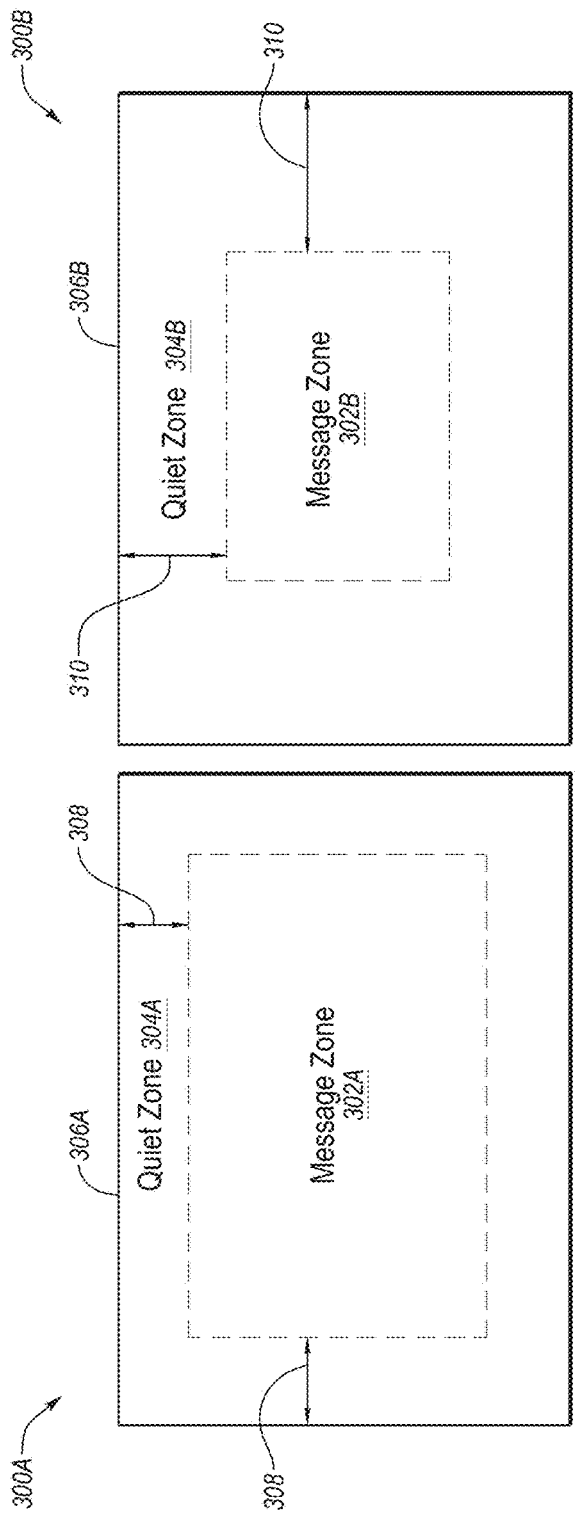
*Fig. 3A*
*Fig. 3B*
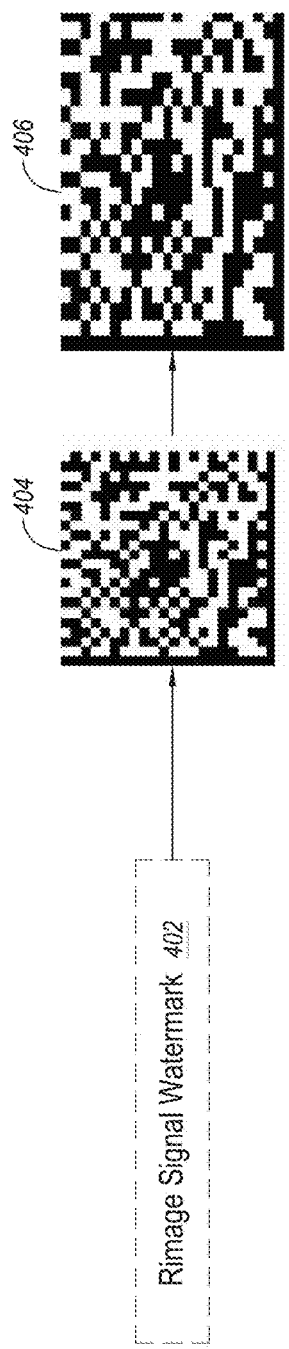
*Fig. 4*

CONTENT WATERMARKING

CROSS-REFERENCE TO RELATED APPLICATION

This application is a divisional application under 35 U.S.C. §121 of and claims priority under 35 U.S.C. §120 to co-pending U.S. application Ser. No. 13/840,107, filed on Mar. 15, 2013, which is herein incorporated by reference in its entirety.

FIELD

The embodiments discussed herein generally relate to digital content watermarking.

BACKGROUND

Digital watermarking is an efficient technology to hide information in digital content such as images and video. In a general watermarking system, a message is converted to a watermark using a watermark generator. The watermark may be embedded in digital content using a watermark encoder. The watermarked content is transmitted through a channel, such as the Internet, to consumers. Distortions such as transcoding, filtering and resolution change may be introduced to the watermarked content during the transmission. A watermark decoder may be used to attempt to detect the watermark in the distorted watermarked content and thereby retrieve the message.

Common distortions include transcoding, frame rate changes, camcorder capture, and geometric distortions such as cropping, rotation, shifting, and scaling. Geometric distortions often fail watermark decoding in many watermarking algorithms by destroying synchronization between the watermark encoder and the watermark decoder. Synchronization in some watermarking algorithms may refer to aligning a block at the watermark decoder with the corresponding block at the watermark encoder. Geometric distortions often destroy the alignment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

The embodiments discussed herein generally relate to digital content watermarking.

In an example embodiment, a method of watermarking a video includes generating three or more pilot signals. The method also includes generating a watermark. The method also includes embedding the three or more of the pilot signals in a first set of frames of the video according to a pilot just-noticeable-difference (JND) model. The method also includes embedding the watermark in a second set of frames of the video according to a watermarking just-noticeable-difference (JND) model. The second set of frames may be non-overlapping with the first set of frames.

In another example embodiment, a method of decoding a watermarked video includes receiving a video including a watermark and three or more pilot signals. The method also includes selecting one or more decoding starting points in the video. The method also includes attempting to detect the watermark in the video based on the one or more decoding starting points of the video. If the attempt is successful, the method also includes retrieving a message from one or more detected watermarks. If the attempt fails, the method also includes: detecting the pilot signals in the video; based on the detected pilot signals, estimating a geometric distortion of the video; inverting the geometric distortion to generate a warped video; selecting one or more decoding starting points in the warped video; and attempting to detect the watermark in the warped video based on the one or more decoding starting points of the warped video.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 is a block diagram of an example operating environment in which digital watermarking may be implemented;

FIGS. 3A-3B illustrate two example frames of a video with message zones within which a watermark and/or pilot signals may be embedded;

FIG. 4 illustrates an example message and a corresponding watermark;

DETAILED DESCRIPTION

Figure 2A:
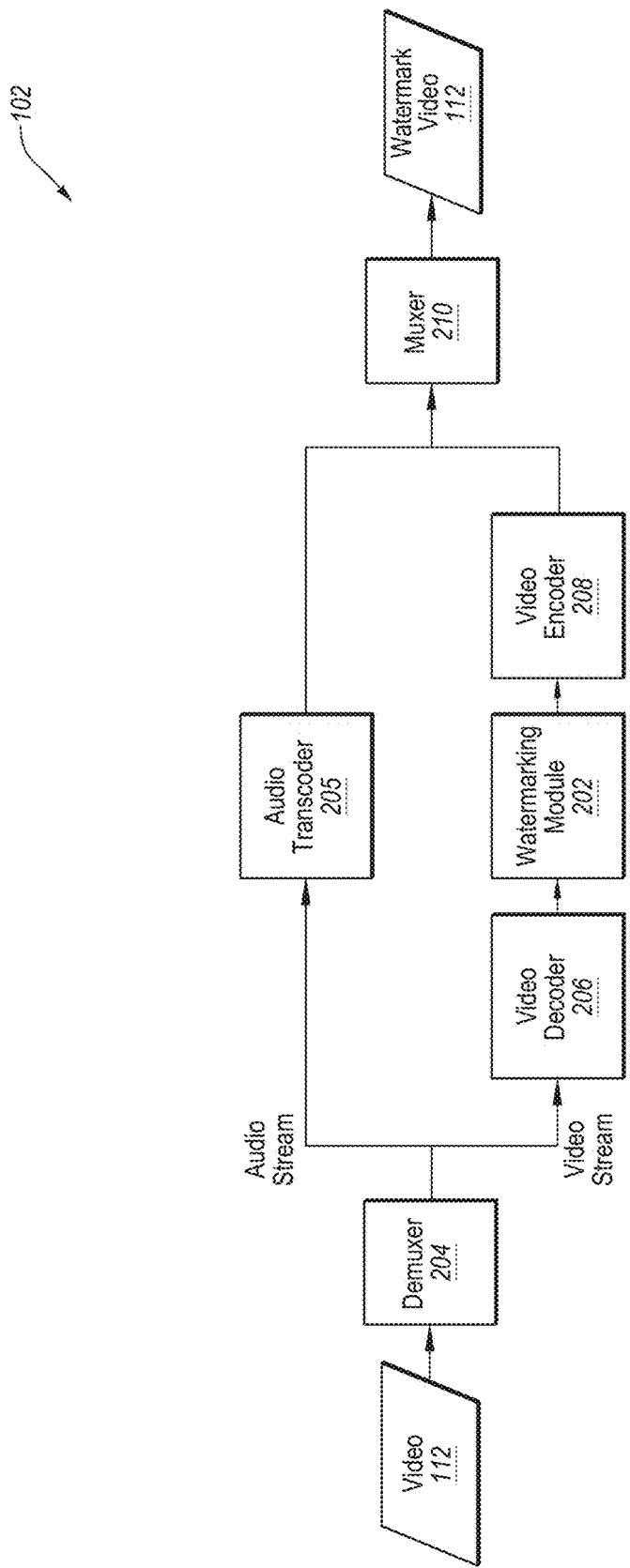
FIG. 2A is a block diagram of an example embodiment of a watermarking system of FIG. 1.

Digital watermarking has been an active area of research for decades. Many watermarking algorithms have been proposed. Some embed watermarks directly in spatial domains. For example, a least significant bit (LSB) modulation algorithm disclosed in Delp: "A Watermark For Digital Images," IEEE ICIP 1996, embeds watermarks by modulating the least significant bits of selected image samples. The LSB modulation algorithm is vulnerable to common image processing and geometric distortions. A patchwork watermarking algorithm disclosed in Bender: "Techniques For Data Hiding," IBM Systems Journal, 1996, embeds watermarks by choosing two patches and increasing the image data in one patch while decreasing the image data in the other. This algorithm has low watermarking capacity, usually one bit of information per image. An algorithm resisting to shifting, rotation and scaling was proposed in Kutter: "Watermarking Resisting To Shifting, Rotation, And Scaling," IEEE TIP 2002. However, the algorithm proposed in Kutter has a very low watermarking capacity.

Other watermarking algorithms embed watermarks in transform domains such as discrete cosine transform (DCT), discrete wavelet transform (DWT), discrete Fourier transform (DFT), Fourier-Mellin transform (FMT) [Kim03], log-polar transform (LPT), and complex wavelet transform (CWT). DCT and DWT have high watermarking capacity but need additional effort to combat geometric distortions. A DFT-based algorithm can achieve shift invariance but has low watermarking capacity. FMT is rotation, scaling and translation invariant but watermarking in the FMT domain has two major drawbacks: the need to compute lossy inverse LPT that reduces watermark decoding performance and the need to maintain FFT symmetry that reduces watermarking capacity.

Quantization index modulation (QIM) is a quantization-based scheme. It can work in either the spatial domain or the transform domain but works more often in the transform domain. It switches between two quantizers of transform coefficients depending on whether a "1" or "0" is embedded. The transform domain algorithms are usually more computationally complex than spatial domain ones but more robust.

To combat geometric distortions, some algorithms use invariant transforms such as DFT, FMT and LPT as discussed above. Some algorithms use a special arrangement of the watermark to make it survive certain geometric distortions. However, it is very difficult for known algorithms to survive various geometric distortions. Furthermore, the special arrangement required to survive the geometric distortions usually reduces the watermarking capacity. Some other algorithms use salient features of an image to estimate geometric distortions, but these algorithms are mainly used for image watermarking because it is hard to keep the same salient points in a group of video frames. A promising approach is embedding a template along with the watermark. The template is solely used to estimate the geometric distortions. However, both the template and the watermark are usually embedded in the same domain. This causes interference and resource competition between two signals, which decrease watermarking performance.

Many watermarking algorithms take into account the perceptual characteristics of the human visual system (HVS) using perceptual models such as a just-noticeable-difference (JND) model. The same amount of distortion in different circumstances has different impacts to HVS. For example, the same amount of distortion at a smooth area in an image can be very annoying to HVS while that at a highly textured area is unnoticeable at all. This property is used in JND models to weight the watermarking strength differently at different areas in an image while keeping the watermark invisible to HVS.

In view of the foregoing, some embodiments disclosed herein watermark videos by embedding information in both the spatial domain and the transform domain. In particular, an example embodiment embeds three or more pilot signals in the spatial domain to provide robustness to geometric distortions. Three pilot signals may be used to estimate and invert geometric distortions modeled as an affine transformation. Alternately, four pilot signals may be used to estimate and invert geometric distortions formulated as a 3 by 3 perspective transform.

In addition to the pilot signals embedded in the spatial domain, a watermark is embedded in the transform domain, allowing a relatively large watermarking capacity. The pilot signals may be embedded in different frames than the watermark. Moreover, each of the watermark and the pilot signals may be embedded according to a corresponding JND model. An example pattern for embedding pilot signals and a watermark in frames of a video may include, for instance, PPPPPPPPPWPPPPPPPPPW, where P stands for a frame with embedded pilot signals (hereinafter "pilot frame") and W stands for a frame with an embedded watermark (hereinafter "watermarked frame"). Other patterns of pilot frames and watermarked frames may alternately or additionally be implemented.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a block diagram of an example operating environment 100 in which digital watermarking may be implemented, arranged in accordance with at least some embodiments described herein. The environment 100 includes a watermarking system 102, a watermark decoder 104, and a transmission channel 106.

In the illustrated embodiment, the watermarking system 102 includes a watermark generator 102A and a watermark encoder 102B. The watermark generator 102 is configured to receive a message 108A and to generate a watermark 110 representing the message 108A. The message 108A may generally include any desired information, such as copyright information, information identifying a particular intended recipient of the content, or the like. In an example embodiment, the watermark 110 includes a matrix or two-dimensional (2D) barcode. For example, the watermark 110 may include an Aztec Code, a QR Code, a Code 49 barcode, a CyberCode, a Data Matrix code, a ShotCode, or the like or any combination thereof. In some embodiments, 2D barcodes are used for watermarking since some 2D barcodes have efficient error correction coding mechanisms and thus have relatively high error tolerance.

The watermark encoder 102B is configured to receive content such as a video 112 and to encode the watermark 110 in the video 112 to generate a watermarked video (not shown). Thereafter, the watermarked video may be distributed to one or more users over a network connection, on digital versatile discs (DVDs) or other computer-readable medium, or in any other manner or form. In some embodiments, different watermarks 110 representing different messages 108A may be used to watermark the video 112 when intended for different users.

As previously indicated, the watermark 110 represents a message 108A that may identify a particular distributer or recipient of content, or may otherwise provide some sort of identifier. The content may include copyrighted content, or otherwise proprietary content, that may be embodied in a variety of forms such as the video 112 which does not include the watermark 110, or one or more watermarked videos with the same or different watermarks.

If an unauthorized copy of the content is provided on a social media site, such as youtube, or the like, or elsewhere, the content can be analyzed for a watermark. If the content includes a watermark, the watermark can be used to identify a source of the unauthorized copy of the content. For example, suppose the message 108A identifies a user, User1, intended to receive a watermarked copy of the video 112, and the message 108A is converted to a watermark 110 which is encoded in the video 112 to generate the watermarked video. If, after receiving the watermarked video, User1 publishes or distributes an unauthorized copy of the watermarked video, or if User1 doesn't take adequate precautions to prevent others from generating unauthorized copies of the watermarked video, or if unauthorized copies of the watermarked video provided to User1 otherwise become available, the watermark decoder 104 may analyze such unauthorized copies to detect a watermark therein, and to extract a message 108B from the detected watermark. If the message 108B matches the message 108A, the unauthorized copy of the watermarked video may be traced back to User1 since the message 108A identifies the User1 as the recipient of the watermarked video. Optionally, steps may be taken to prevent User1 from making or allowing unauthorized copies of watermarked content from being made in the future.

In view of the foregoing, the transmission channel 106 generally represents any channel or path of travel traversed by content output by the watermarking system 102 and received at the watermark decoder 104. For example, the transmission channel 106 may include a distribution channel suitable for authorized distribution of hardcopies or softcopies of the content, as well as a channel suitable for transmitting or distributing unauthorized copies of the content.

Within the transmission channel 106, the watermarked video may undergo or be subjected to various distortions, such as transcoding (recompression), a change in frame rate (such as from 24 frames per second to 30 frames per second, or vice versa), cropping, rotation, shifting, scaling, camcorder capture, or the like or any combination thereof. The term "scaling" as used herein may include a change in aspect ratio. Embodiments disclosed herein include watermarking algorithms that are tolerant to any of the foregoing distortions and/or other distortions, either alone or in combinations of two or even more distortions.

FIG. 2A is a block diagram of an example embodiment of the watermarking system 102 of FIG. 1, arranged in accordance with at least some embodiments described herein. As illustrated, the watermarking system 102 includes a watermarking module 202 that may correspond to and/or include the watermark generator 102A and the watermark encoder 102B of FIG. 1. In addition, the watermarking system 102 may include a demuxer 204, an audio transcoder 205, a video decoder 206, a video encoder 208, and a muxer 210. The watermarking system 102 may be implemented in hardware, software, firmware, or any combination thereof. Alternately or additionally, the watermarking system 102 may include or be implemented on a computer including a processing device and a computer-readable medium on which some or all of the watermarking system 102 is stored as computer instructions, the computer instructions being executable by the processing device to perform the watermarking operations described herein.

In operation, the demuxer 204 is configured to receive the video 112 and to demultiplex ("demux") or divide the video into its constituent audio and video streams. The demuxer 204 may be configured to demux videos in any of a variety of containers or formats including, but not limited to, Audio Video Interleaved (AVI), Windows Media Video (WMV), MPEG-4 Part 14 (MP4), or QuickTime Movie (MOV).

The audio transcoder 205 is configured to transcode the audio stream. An output format of the transcoded audio stream may be a user-specified or default output format.

The decoder 206B is configured to decode the video stream. Decoding the video stream may include identifying a corresponding video codec and decoding the video stream based on the identified video codec. The video codecs may include, but are not limited to, AVC1 (H264), DIVX (MPEG-4), DIV3 (MPEG-4.3), MP42 (MPEG-4.2), MPG2 (MPEG-2), MJPG (motion jpeg), FLV1, PIm1 (MPEG-1), or the like.

The watermarking module 202 is configured to generate a watermark representing a message and to encode the watermark in the decoded video stream. In some embodiments, the watermarking module 202 is additionally configured to generate one or more pilot signals and to embed the pilot signals in the decoded video stream. Alternately or additionally, the watermarking module 202 may be configured to spatially confine the watermark (or a watermark message zone) and/or the pilot signals within a message zone of one or more frames of the video stream for cropping tolerance, where the message zone excludes a perimeter area of the frames.

The video encoder 208 is configured to encode the watermarked video stream. Encoding the watermarked video stream may include encoding the video stream according to a default or user-specified video codec, such as one or more of the video codecs listed above.

The muxer 210 is configured to receive the encoded audio stream and the encoded watermarked video stream and to multiplex ("mux") or combine the two streams together to generate a watermarked video 212. Muxing the two streams together may include packaging the two streams together in a default or user-specified container, such as one or more of the containers listed above.

Many watermarking systems accept a video in raw data format that contains only video stream and output the watermarked video in raw data format as well. Such watermarking systems require a relatively large amount of storage space and the addition of other major components such as a demuxer, a codec, and a muxer. In comparison, according to some embodiments, the watermarking system 102 of FIG. 2A integrates all components with the watermarking workflow. Accordingly, the watermarking system 102 may accept video files with audio in any of various formats and may output a watermarked video file with audio also in any of various formats. The particular output format may be a default format or a user-selected format.

Figure 2B:
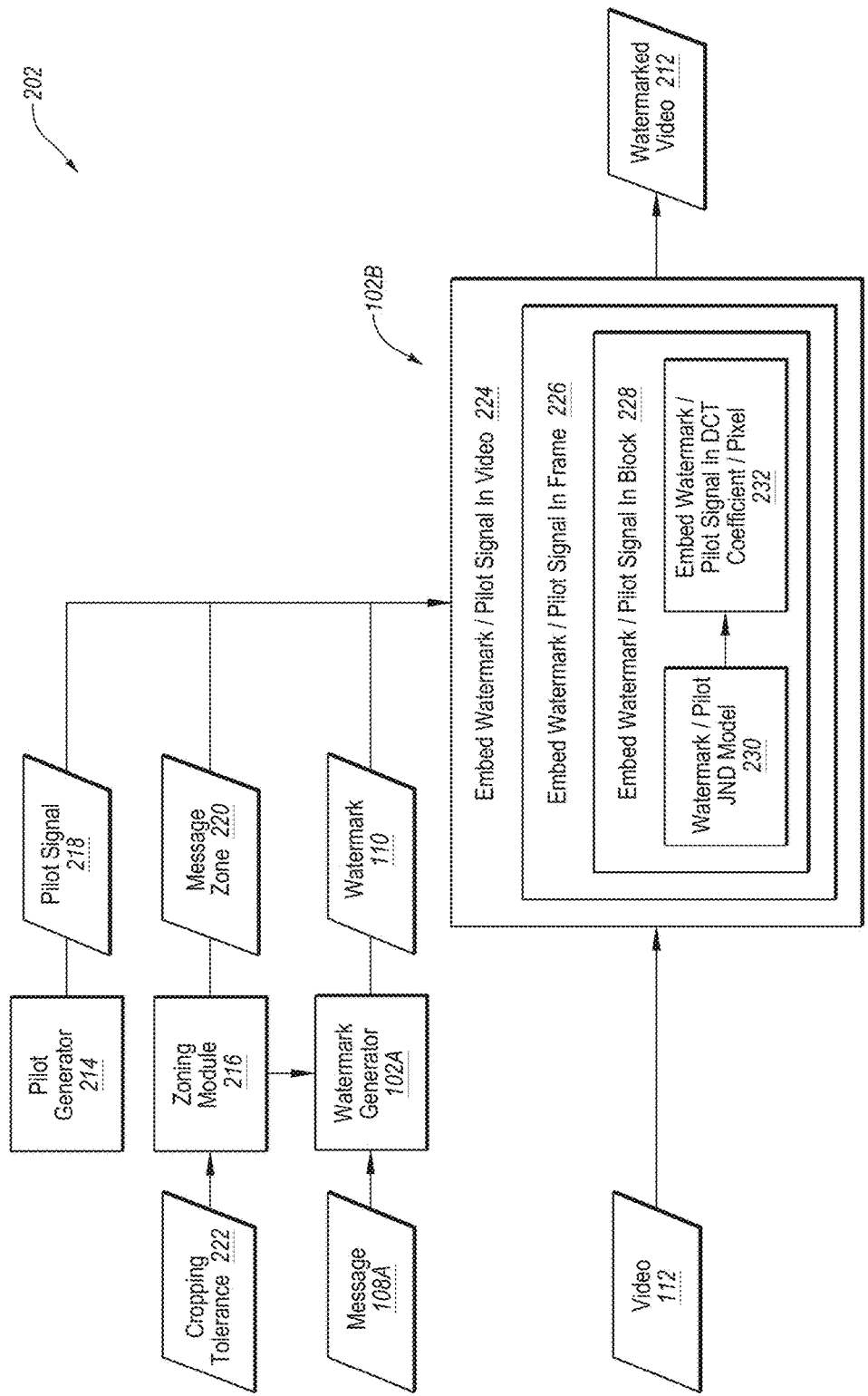
FIG. 2B is a block diagram of an example architecture for a watermarking module included in the watermarking system of FIG. 2A.

FIG. 2B is a block diagram of an example architecture for the watermarking module 202 of FIG. 2A, arranged in accordance with at least some embodiments described herein. As illustrated, the watermarking module 202 includes the watermark generator 102A and the watermark encoder 102B of FIG. 1. The watermarking module 202 additionally includes a pilot generator 214 and a zoning module 216.

As previously mentioned, the watermark generator 102A is configured to generate the watermark 110 as a representation of the message 108A.

The pilot generator 214 is configured to generate one or more pilot signals 218.

The zoning module 216 is configured to determine a message zone 220 within which to embed a message zone of the watermark 110 in frames of the video 112. The message zone 220 may be determined based on a cropping tolerance 222. The cropping tolerance 222 may be a default cropping tolerance or a user-specified cropping tolerance, or the like or any combination thereof. The cropping tolerance 222 may indicate how much area of frames of the video 112 may be cropped without cropping the message zone 220 in which a message zone of the watermark 110 and/or the pilot signals 218 are embedded. In an example embodiment, the cropping tolerance 222 includes a maximum number of rows and/or columns of pixels in each frame that may be cropped without failing watermark decoding.

In these and other embodiments, the watermark 110 may be embodied as a 2D barcode. Some 2D barcode symbologies include a message zone and a surrounding quiet zone. In some embodiments, the watermark 110 may generally be embedded in a frame of the video by scaling the watermark 110 so that the message zone of the watermark 110 coincides with the message zone 220 and the quiet zone of the watermark 110 is excluded from the message zone 220 and coincides with the quiet zone of the frame. Alternately, all of the watermark 110, including the watermark message zone and the watermark quiet zone, may be embedded in the message zone 220.

As indicated above with respect to FIG. 1, the watermark encoder 102B is configured to receive the video 112 and the watermark 110 as inputs. Additionally, the inputs received by the watermark encoder 102B may include the pilot signals 218 and the message zone 220. As denoted at 224, the watermark encoder 102B may be configured to embed both the watermark 110 and the pilot signals 218 in the video 112.

As further denoted at 226, embedding the watermark 110 and the pilot signals 218 in the video 112 may include embedding the watermark 110 and/or the pilot signals 218 in one or more frames of the video 112. The watermark 110 and the pilot signals 218 may be embedded in all or only some of the frames of the video 112. Alternately or additionally, some frames of the video 112 may include both the watermark 110 and the pilot signals 218, only the watermark 110, only the pilot signals 218, only some—but not all—of the pilot signals 218, or the like.

As further denoted at 228, embedding the watermark 110 and/or the pilot signals 218 in one or more frames of the video 112 may include embedding the watermark 110 and/or the pilot signals 218 in one or more blocks of the corresponding frame. The block embedding of the watermark 110 and/or the pilot signals 218 may be performed subject to a just-noticeable-difference (JND) model 230 that is different for embedding the watermark 110 than for embedding the pilot signals 218, or that is the same for both.

As further denoted at 232, embedding the watermark 110 and/or the pilot signals 218 in one or more blocks of the corresponding frame may include embedding the watermark 110 in discrete cosine transform (DCT) coefficients of the blocks and/or embedding the pilot signals 218 in pixels of the blocks, each subject to the applicable JND model 230.

In some embodiments, the watermarking module 202 of FIGS. 2A-2B and/or the watermarking system 102 of FIGS. 1 and 2A may implement, execute, or call functions from or otherwise depend on one or more libraries. Such libraries may include, but are not limited to, Open Source Computer Vision Library (OpenCV) and FFmpeg. OpenCV includes numerous computer vision algorithms, some of which may be used in at least some embodiments described herein. FFmpeg includes the libavcodec audio/video codec library, the libavformat audio/video container mux and demux library, and other libraries, some of which may be used in at least some embodiments described herein.

FIGS. 3A-3B illustrate two example frames 300A, 300B (collectively "frames 300") of a video with message zones 302A, 302B (collectively "message zones 302") that may correspond to the message zone 220 of FIG. 2B, arranged in accordance with at least some embodiments described herein. The message zones 302 may be applied to the frames 300 to define an area of each frame 300 within which a watermark message zone and/or pilot signals may be embedded, referred to as the "message zone." As illustrated in FIGS. 3A-3B, the message zones 302 each exclude a corresponding quiet zone 304A, 304B (collectively "quiet zones 304"). The quiet zones 304 each include a perimeter area between a corresponding frame perimeter 306A, 306B (collectively "frame perimeters 306") and the corresponding message zone 302 of the corresponding frame 300. The entire area within each frame perimeter 306, including both the corresponding message zone 302 and the corresponding quiet zone 304, corresponds to the area of the corresponding frame 300.

FIGS. 3A-3B further illustrate a cropping tolerance 308, 310 associated with each of the message zones 302. As previously indicated, cropping tolerance 308, 310 may indicate how much area of the frames 300 may be cropped without cropping the message zone 220 and the corresponding watermark message zone or pilot signals embedded therein. The cropping tolerance 308 above, below, to the left of, or to the right of the message zone 302A may be the same or different. Analogously, the cropping tolerance 310 above, below, to the left of, or to the right of the message zone 302B may be the same or different.

By spatially confining a watermark message zone and/or pilot signals within a central area of frames, such as within the message zones 302, watermarked videos may be generated which are tolerant to cropping. The cropping tolerance may be increased by decreasing the relative size of the message zone 302 with respect to the frame. For example, a frame with the message zone 302B of FIG. 3B may be relatively more tolerant to cropping than a frame with the message zone 302A of FIG. 3A. On the other hand, decreasing the relative size of the message zone 302 may decrease tolerance to other distortions such as recompression, scaling, and/or rotation since the watermark is embedded in relatively less frame space. Accordingly, the size of the message zone 302 may be selected or configured to favor a tolerance to a particular one or more of the distortions and/or to strike a balance in between.

FIG. 4 illustrates an example message 402 and a corresponding watermark 406, arranged in accordance with at least some embodiments described herein. The message 402 may correspond to the message 108A and the watermark 406 may correspond to the watermark 110 already described herein. As illustrated in FIG. 4, the message 402 includes the phrase "Rimage Signal Watermark." More generally, the message 402 may include a desired sequence of alphanumeric characters, other symbols, or any other information, subject to the information capacity of the watermark 404.

The watermark 406 may be generated from a barcode 404. The barcode 404 generally includes a representation of the message 402. For example, the barcode 404 specifically includes a Data Matrix representation of the message 402, although other 2D barcodes may alternately or additionally be used. In some embodiments, the barcode 404 may be generated from the message 402 using the libdmtx software library or other suitable software or hardware. The barcode 404 illustrated in FIG. 4 includes both a message zone including the black and white pixels collectively arranged in a square, and a quiet zone surrounding the message zone. The quiet zone generally includes blank space (e.g., white pixels). The message zone and the quiet zone of the barcode 404 are not separately labeled.

With combined reference to FIGS. 3A-4, and due to differences in size and/or aspect ratio between the barcode 404 and a corresponding one of the message zones 302, the message zone of the barcode 404 may not fill all of the available area within the corresponding message zones 302. Accordingly, the barcode 404 may be resized to generate the watermark 406 having a watermark message zone (e.g., the black and white pixels collectively arranged in a rectangle) that substantially matches the corresponding message zone 302, such that a quiet zone surrounding the watermark message zone is included in a corresponding one of the quiet zones 304. In some embodiments, each pixel of the watermark 406 corresponds to an 8×8 block of a frame in which the watermark 406 is embedded.

Figure 5:
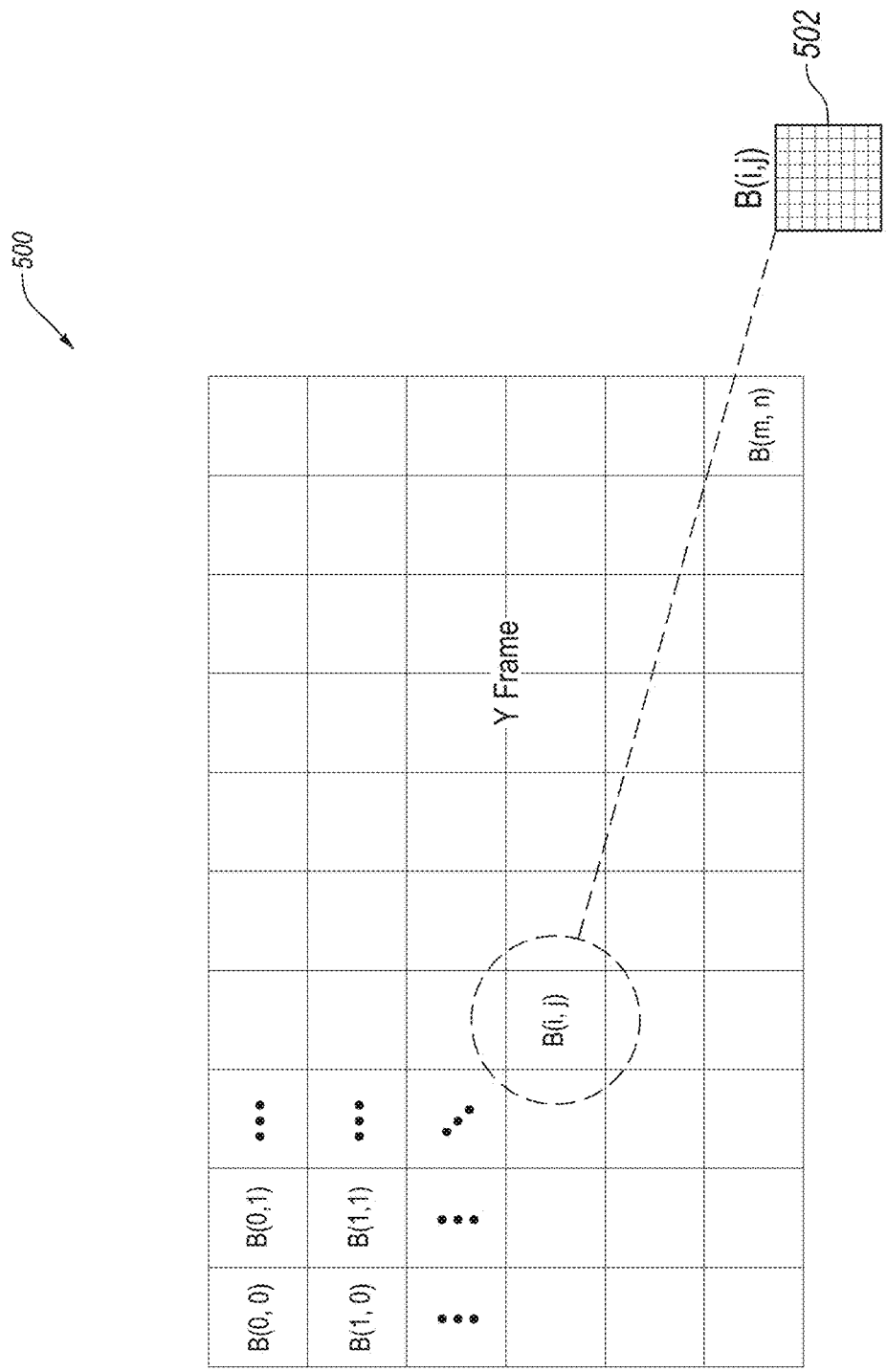
FIG. 5 illustrates an example Y frame of a video in which a watermark and/or pilot signals may be embedded.

In some embodiments, embedding a watermark in a video includes embedding the watermark in the Y luminance component in the YCrCb color space of at least some frames of the video. The watermark may be embedded in the Y luminance component since the Y luminance component may have a higher resolution and smaller quantization step than the Cr and Cb components in video compression. In isolation from the Cr and Cb components, the Y luminance components of a given frame may be referred to as a Y frame. FIG. 5 illustrates an example Y frame 500, arranged in accordance with at least some embodiments described herein. Although not illustrated, the Y frame 500 may include a message zone and a quiet zone and the watermark may be sized so that the watermark message zone is embedded in the message zone of the Y frame 500 and the watermark quiet zone is embedded in the quiet zone of the Y frame 500.

As already mentioned, embedding the watermark may include embedding the watermark in one or more blocks of a frame. In some embodiments, embedding the watermark in one or more blocks of the video may include embedding the watermark in one or more blocks of a Y frame, such as the Y frame 500. An example implementation will now be described with respect to FIG. 5.

In general, in embodiments in which the watermark is a 2D barcode, the watermark is a binary image made up of black and white (or 1 and −1) bits, and the watermark bits are embedded in the DCT coefficients of 8×8 blocks based on a watermarking JND (hereinafter "JND") model. Accordingly, the watermark may be spatially localized for cropping tolerance.

To embed a watermark in the Y frame 500, the Y frame 500 may be partitioned into 8×8 blocks, each block being generically referred to as B(i,j), where $0 \leq i \leq m$ and $0 \leq j \leq n$. More particularly, as illustrated in FIG. 5, a top-left block is B(0, 0), a next block to the right is B(0, 1), a block immediately beneath B(0, 0) is B(1, 0), a block immediately to the right of B(1, 0) is B(1, 1), and so on to a bottom-right block B(m, n). As depicted in inset 502, each block B(i,j) may include an 8×8 array of pixels. More particularly, each block B(i,j) in the Y frame 500 may include Y luminance components for corresponding pixels in the corresponding frame.

An 8×8 pseudorandom block $B_r(x,y)$ is also generated having elements x, y=0, 1, . . . , 7 with a pseudo normal distribution N(0, 1). A DCT is applied to each block B(i,j) of the Y frame 500 to generate a corresponding DCT block C(x,y). The watermark may then be embedded in coefficients of each DCT block C(x,y) to generate a corresponding watermarked DCT block $C_w(x,y)$ according to equation 1 below:

$$C_w(x,y) = C(x,y) + s_w \cdot W(i,j) \cdot B_r(x,y) \cdot JND_w(x,y) \quad \text{(equation 1)},$$

where $s_w$ is a non-negative number representing watermarking strength, W(i,j) is a corresponding block of the watermark, and $JND_w(x,y)$ is a formula representing the watermarking JND model. The watermarking strength $s_w$ may be a default value or a user-defined value.

Equation 2 below is an example implementation of the $JND_w(x,y)$ formula according to some embodiments:

$$JND_w(x,y) = \max\{C_{To}(x,y), C_{To}(x,y) | (C(x,y)/C_{To}(x,y))|^\epsilon\} \quad \text{(equation 2)},$$

where $C_{To}(x,y) = Tf(x,y) \times (DC/C_0)^a$, Tf(x,y) is half of a quantization step-size of C(x,y), DC is a discrete cosine coefficient, $C_0$ is a global mean of a luminance for 8-bit images—which may be 1024, a=0.649, and $\epsilon$=0.33.

The foregoing example describes embedding the watermark in the Y luminance component. Accordingly, a frame to be watermarked may first be converted into the YCrCb color space if not already in the YCrCb color space. Alternately or additionally, the watermark may be embedded in the Cr and/or Cb components of one or more frames.

As previously indicated, in some embodiments, the pilot signals may be embedded in different frames than the watermark. The pilot signals may generally include three or more pilot signals that are spatially separated from each other to provide a geometric frame of reference if geometric distortions are estimated and inverted based using an affine transformation model. Alternately or additionally, the pilot signals may include four or more pilot signals that are spatially separated from each other if geometric distortions are estimated and inverted using a 3 by 3 perspective transform.

In general, the three or more pilot signals may be detected in a watermarked video with geometric distortions. When the locations of the pilot signals do not match the expected locations in a watermarked video without geometric distortions, the nature of the geometric distortions may be estimated and inverted based on the locations of the pilot signals in the watermarked video with geometric distortions as compared to the expected locations. Examples of geometric distortions include rotation, cropping, shifting, and scaling.

Figure 6B:
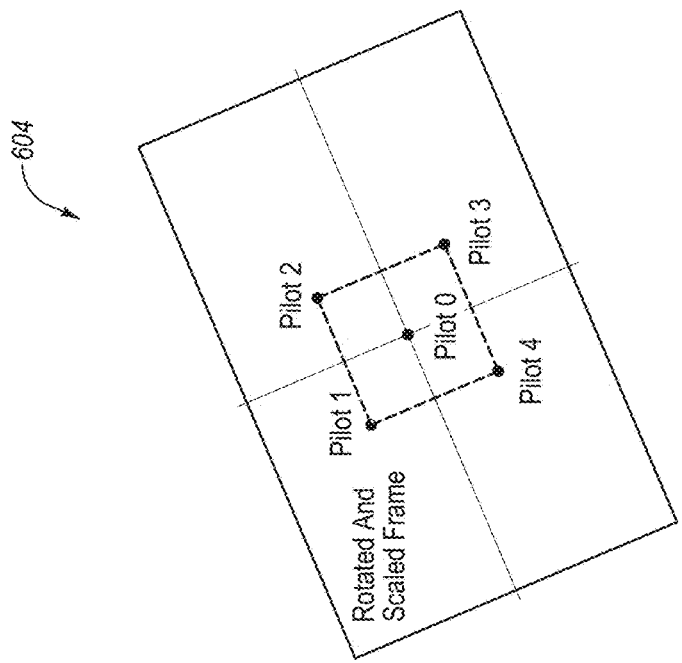
FIGS. 6A-6C include example frames with embedded pilot signals.
Figure 6A:
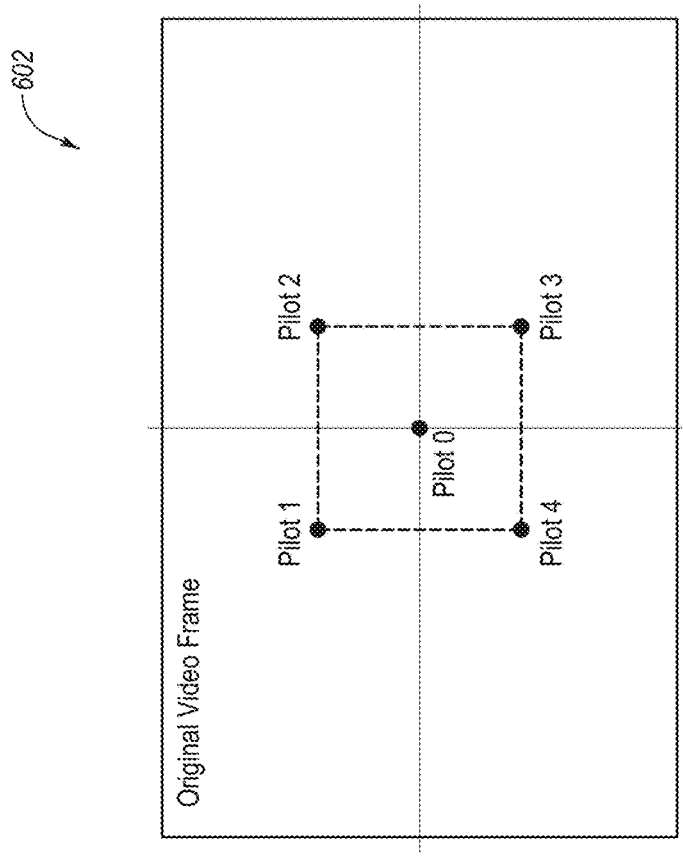
Figure 6C:
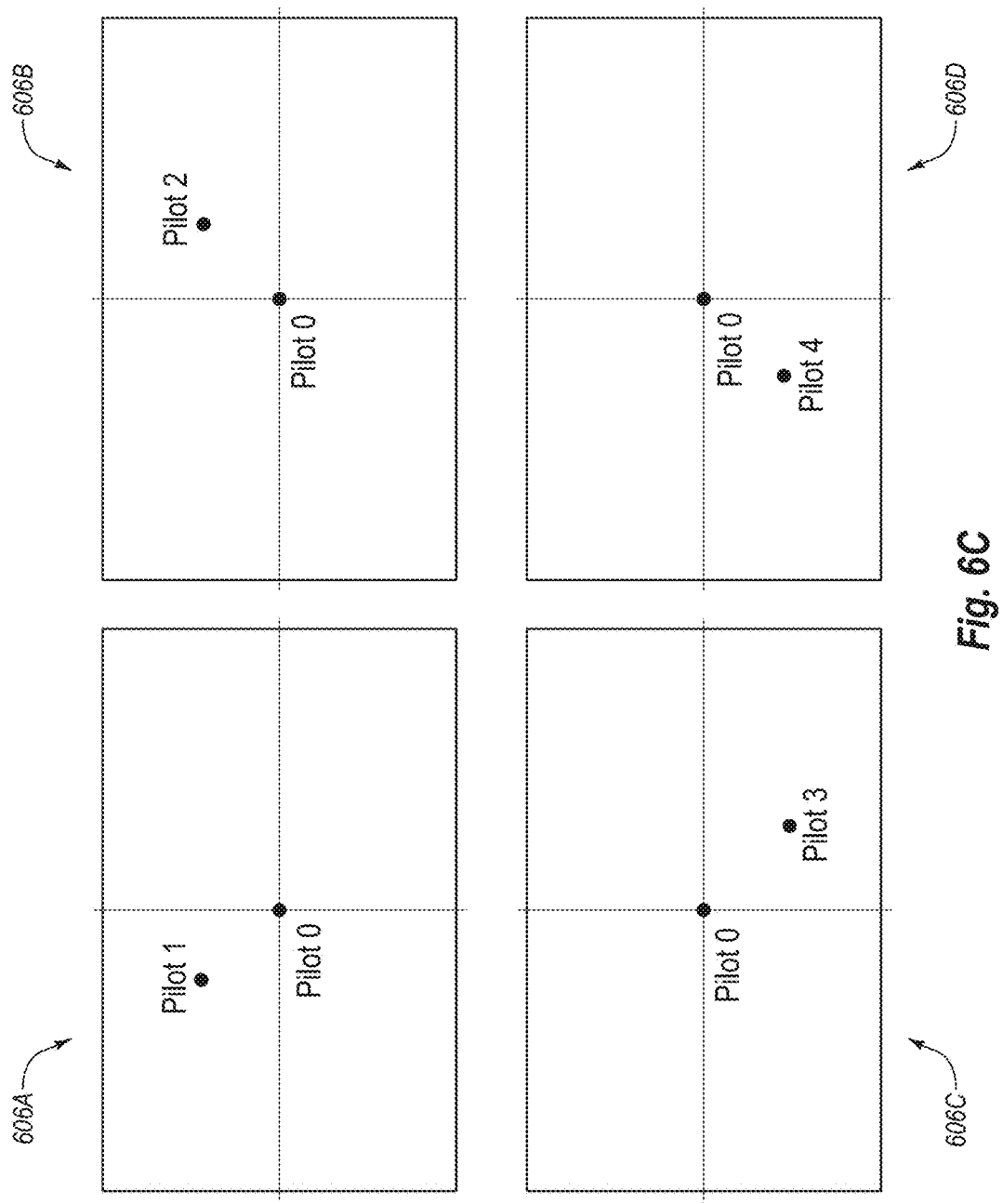

FIGS. 6A-6C include example frames with embedded pilot signals, arranged in accordance with at least some embodiments described herein. As illustrated in FIG. 6A, a total of five pilot signals may be embedded in a frame 602, including pilot0, pilot1, pilot2, pilot3, and pilot4. More generally, and as already indicated, as few as three or more pilot signals may be used. In the illustrated embodiment, however, the five pilot signals include the center pilot signal pilot0 for autocorrelation-based pilot detection as explained below, and the four pilot signals pilot1-pilot4 generally located at the four corners of a square (or more generally, a rectangle) for estimating all coefficients of a perspective transform. Although not shown in FIGS. 6A-6C, the pilot signals may be embedded within a message zone of the frames.

FIG. 6B illustrates a distorted frame 604 corresponding to the frame 602 of FIG. 6A. In particular, the distorted frame 604 is rotated and scaled as compared to the frame 602. It can be seen from FIGS. 6A and 6B that geometric distortions change the locations of the pilot signals. By comparing the locations of the pilot signals in the distorted frame 604 to the locations of the pilot signals in the frame 602, the distortions may be estimated. For instance, the amount of rotation and scaling may be estimated based on the comparison.

As indicated previously, the pilot signals may be embedded according to a JND model that is different than the watermarking JND model used for embedding the watermark. The JND model used for embedding the pilot signals may be referred to as a pilot JND model, which may be represented by a pilot JND formula, hereinafter $JND_P(x,y)$. Two different JND models may be used since the watermark and pilot signals may be embedded in different domains, e.g., the pilot signals may be embedded in the spatial domain while the watermark may be embedded in the DCT domain, and different JND models may be suitable for different domains.

In some embodiments, the center pilot signal, pilot0 or $P_0(x,y)$, is defined according to equation 3 below:

$$P_0(x,y) = s_p \cdot JND_P(x,y) \cdot \phi(x,y) \quad \text{(equation 3)},$$

where x=0, 1, . . . , width−1; y=0, 1, . . . , height−1; width and height are the width and height of the frame in which pilot0 is being embedded; and $\phi(x,y)$ is a pseudorandom array having a same size as the frame. The $JND_P(x,y)$ formula may be calculated according to the JND formulas disclosed in Kutter: "A Vision-Based Masking Model for Spread-Spectrum Image Watermarking," IEEE TIP 2002; and/or Yao: "Image Quality Assessment Using Foveated Wavelet Error Sensitivity and Isotropic Contrast," IEEE ISCAS 2007, or according to any other suitable JND formula.

The remaining pilot signals, including pilot1-pilot4, may be generated by shifting pilot0 according to equation 4 below:

$$P_i(x,y) = P_0(x+x_i, y+y_i) \quad \text{(equation 4)},$$

where i=1, 2, 3, 4.

Embedding pilot signals in a frame may degrade its visual quality. The more pilot signals included in a frame, the more degraded its visual quality may become. Accordingly, the pilot signals may be spread across multiple frames in some embodiments. For example, FIG. 6C illustrates four different frames 606A-606D (collectively "frames 606"), arranged in accordance with at least some embodiments described herein. As illustrated, pilot0 and pilot1 are embedded in frame 606A, pilot0 and pilot2 are embedded in frame 606B, pilot0 and pilot3 are embedded in frame 606C, and pilot0 and pilot4 are embedded in frame 606D. In some embodiments, each set of pilot signals illustrated in FIG. 6C may be embedded in a different subset of frames than any other set of pilot signals to spread the pilot signals through the video.

A frame with pilot signals may then be described according to equation 5 below:

$$\hat{I}(x,y) = I(x,y) + P_0(x,y) + P_i(x,y) \quad \text{(equation 5)},$$

where I is the corresponding Y frame and $\hat{I}$ is the frame with pilot signals.

Equation 6 below is an example implementation of the $JND_P(x,y)$ formula according to some embodiments:

$$JND_P(x,y) = JND_{Pb}(x,y) \cdot F_l(x,y) \cdot F_{tex}(x,y) \cdot F_{tem}(x,y) \quad \text{(equation 6)},$$

where $JND_{Pb}(x,y)$ is a base pilot JND model, $F_l(x,y)$ is a luminance adaptation factor, $F_{tex}(x,y)$ is a texture adaptation factor, and $F_{tem}(x,y)$ is a temporal adaptation factor.

To substantially prevent the pilot signals from being visually perceptible by humans, $JND_{Pb}(x,y)$, $F_l(x,y)$, $F_{tex}(x,y)$, and/or $F_{tem}(x,y)$ may be calculated as disclosed in Kutter (cited above); Yao (cited above); Wei: "Spatio-Temporal Just Noticeable Distortion Profile For Grey Scale Image/Video In DCT Domain," IEEE TCSVT 2009; Yang: "Motion-Compensated Residue Preprocessing In Video Coding Based On Just-Noticeable-Distortion Profile," IEEE TCSVT 2005 (hereinafter "Yang 2005") and/or in any other suitable manner.

Alternately or additionally, $F_l(x,y)$, $F_{tex}(x,y)$, and $F_{tem}(x,y)$ may be calculated according to equates 6a, 6b, and 6c:

$$F_l(x,y) = \begin{cases} \dfrac{[60 - \bar{I}(x,y)]}{150} + 1 & \bar{I}(x,y) \leq 60 \\ 1 & 60 < \bar{I}(x,y) < 170 \\ \dfrac{[\bar{I}(x,y) - 170]}{425} + 1 & \bar{I}(x,y) \geq 170 \end{cases} \quad \text{(equation 6a)}$$

$$F_{tex}(x,y) = \sum_{i=-1}^{1} \sum_{j=-1}^{1} \frac{E(x+i, y+j)}{9}, \text{ and} \quad \text{(equation 6b)}$$

$$F_{tem}(x,y) = \quad \text{(equation 6c)}$$
$$\begin{cases} 2.5 - 0.036[D(x,y) + 200] & -256 < D(x,y) < -200 \\ 1 - 0.017[D(x,y) + 100] & -200 \leq D(x,y) < -100 \\ 1 & -100 \leq D(x,y) < 100 \\ 1 + 0.008[D(x,y) - 100] & 100 \leq D(x,y) < 200 \\ 1.6 + 0.018[D(x,y) - 200] & 200 \leq D(x,y) < 256 \\ 1 & D(x,y) \geq 256 \end{cases}$$

In equation 6a, $\bar{I}(x,y)$ is the average intensity of a 3×3 block centered at (x,y).

In equation 6b, E is the edge map of the frame. E(x,y) has a value of 1 for an edge point and 0 otherwise.

In equation 6c, $F_{tem}(x,y)$ is calculated as a piecewise linear approximation of the temporal factor effect curve disclosed in the Yang 2005 reference cited above. All of the references cited in the present application are incorporated herein by reference. In equation 6c, D(x,y) is calculated according to equation 6d:

$$D(x, y) = \frac{I(x, y, t) - I(x, y, t-1) + \bar{I}(x, y, t) - \bar{I}(x, y, t-1)}{2},$$ (equation 6d)

where I(x,y,t) is the intensity of frame t at (x,y), Î(x,y,t) is the average intensity of the 3×3 block centered at (x,y), t is the current frame and t−1 is the immediately previous frame.

Figure 7:
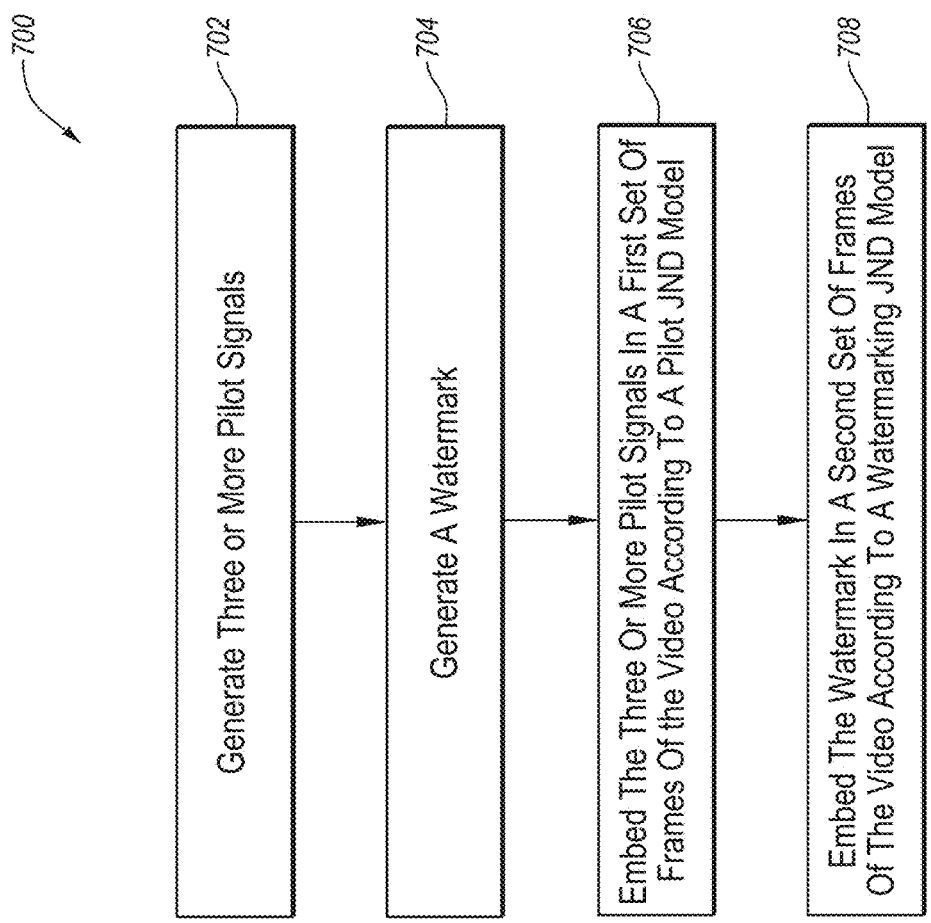
FIG. 7 shows an example flow diagram of a method of watermarking a video.

FIG. 7 shows an example flow diagram of a method 700 of watermarking a video, arranged in accordance with at least some embodiments described herein. The method 700 in some embodiments is performed by the watermarking system 102 and/or by a computer on which the watermarking system 102 is installed. Although illustrated as discrete blocks, various blocks may be divided into additional blocks, combined into fewer blocks, or eliminated, depending on the desired implementation.

The method 700 may begin at block 702 in which three or more pilot signals are generated. In some embodiments, five pilot signals are generated.

In block 704, a watermark is generated. As described above, the watermark may include a 2D barcode representing a message.

In block 706, the three or more pilots signals are embedded in a first set of frames of a video. As used herein, terms such as "first" and "second" are merely used to distinguish between frames, sets of frames, or other items and do not suggest a particular spatial, temporal, or other orientation or order of the items unless context dictates others.

In some embodiments, the three or more pilot signals include five pilot signals including a center pilot signal and first, second, third, and fourth pilot signals defining corners of a rectangle centered on the center pilot signal as disclosed in FIG. 6A. In these and other embodiments, the first set of frames of the video may include first, second, third, and fourth subsets of non-overlapping frames, meaning none of the frames in a given subset are in any of the other subsets. Accordingly, embedding the three or more pilot signals in the first set of frames of the video may include: embedding the center pilot signal and the first pilot signal in the first subset of frames exclusive of the other pilot signals; embedding the center pilot signal and the second pilot signal in the second subset of frames exclusive of the other pilot signals; embedding the center pilot signal and the third pilot signal in the third subset of frames exclusive of the other pilot signals; and embedding the center pilot signal and the fourth pilot signal in the fourth subset of frames exclusive of the other pilot signals.

In block 708, the watermark is embedded in a second set of frames of the video according to a watermarking JND model. The second set of frames may be non-overlapping with the first set of frames, meaning none of the frames included in the second set of frames are also in the first set of frames and none of the frames included in the first set of frames are also in the second set of frames. Embedding the watermark in the second set of frames may include embedding the watermark in the Y luminance component of each of the second frames, including: partitioning the corresponding frame into 8×8 blocks $B(i,j)$, where $0 \le i \le m$, $0 \le j \le n$; generating an 8×8 pseudorandom block $B_r(x,y)$ having elements x, y=0, 1, . . . , 7 with a pseudo normal distribution N(0, 1); applying a discrete cosine transform (DCT) to each block B(i,j) of the Y frame to generate a corresponding DCT block C(x,y); and embedding the watermark—including its watermark quiet zone and watermark message zone—in coefficients of each DCT block C(x,y) to generate a corresponding watermarked DCT block $C_w(x,y)$ according to equation 1 above.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 700 may further include, prior to embedding the watermark or any of the pilot signals, determining a message zone within the frames of the video for embedding the watermark message zone and the pilot signals. The message zone may exclude a perimeter area of the frames of the video as described above.

Alternately or additionally, the method 700 may further include splitting the video into an audio stream and a video stream as described with respect to FIG. 2A. The video stream may include the first and second frames. The pilot signals and the watermark may be embedded in the video stream exclusive of the audio stream. In these and other embodiments, a resulting watermarked video stream may be combined with the audio stream to generate a watermarked video.

Some embodiments described herein include an article of manufacture such as a non-transitory computer-readable medium having computer instructions stored thereon that are executable by a processing device to perform one or more of the operations included in the method 700 of FIG. 7 and/or variations thereof. The non-transitory computer-readable medium and the processing device may be included in the watermarking system 102 above and/or in a computer on which the watermarking system 102 is installed.

Figure 8:
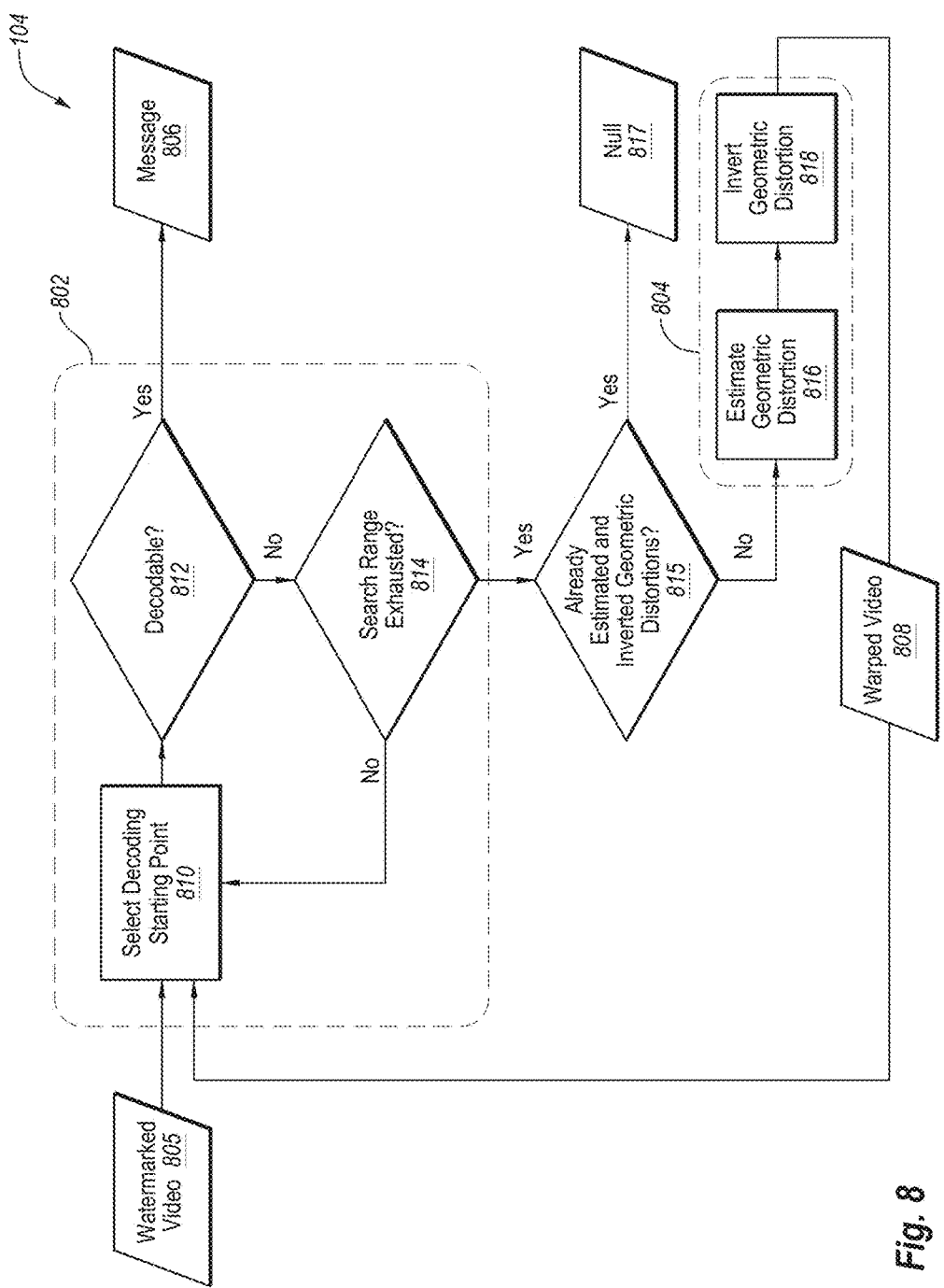
FIG. 8 is a block diagram of an example architecture for a watermark decoder included in the watermarking system of FIG. 2A.

FIG. 8 is a block diagram of an example architecture for the watermark decoder 104 of FIG. 2A, arranged in accordance with at least some embodiments described herein. In the illustrated embodiment, the watermark decoder 104 includes a first decoding module 802 and a second decoding module 804.

In general, the watermark decoder 104 may be configured to implement an "assume and test" strategy on an incoming watermarked video 805 that may include distortions. The watermarked video 805 may include a distorted version of the watermarked video 212 of FIG. 2A, for instance. In the "assume and test" strategy, it is assumed that the watermarked video 805 is decodable as-is, and this assumption is tested by attempting to decode the watermarked video 804 and detect a watermark. In some embodiments, the watermarked video 804 is decodable as-is if the watermarked video 804 lacks any geometric distortions, or if the geometric distortions include only shifting and/or cropping. If the attempt is successful, a watermark may be detected and a message 806 may be retrieved therefrom. If the attempt fails, the watermark decoder 104 estimates one or more geometric distortions of the watermarked video 804, and inverts the geometric distortions for the frames of the watermarked video 804 to generate a warped video 808. The geometric distortions that are estimated and inverted according to some embodiments may include any combination of shifting, cropping, rotation, and/or scaling. The watermark decoder 104 may then attempt to decode the warped video 808 to detect the watermark and extract the message 806.

FIG. 8 additionally depicts an example method that may be implemented by the watermark decoder 104. The method may include one or more steps or operations, as illustrated by one or more of blocks 810, 812, 814, 815, 816, and/or 818.

In more detail, the watermarked video 804 is received by the first decoding module 802 and, at block 810, a decoding starting point is selected in the video.

At block 812, the first decoding module 802 attempts to decode the watermarked video 804 from the decoding starting point and to detect a watermark therein. If the attempt is successful ("Yes" at block 812), the watermark is detected and the message 806 is retrieved therefrom. In embodiments in which the watermark is a 2D barcode, the message 806 may be retrieved from the watermark using any technique for reading a 2D barcode that is now known or later developed.

If the attempt is not successful ("No" at block 812"), the first decoding module 802 determines at block 814 whether a search range for decoding starting points has been exhausted. If the search range has not been exhausted ("No" at block 814), the method returns to block 810 where a new decoding starting point is selected within the search range, and on to block 812 where the first decoding module 802 attempts to decode the watermarked video 805 from the new decoding starting point. In general, the first decoding module 802 may continue attempting to decode the watermarked video 805 and to detect the watermark therein until the attempt is successful or the search range has been exhausted.

If the search range has been exhausted ("Yes" at block 814), it is next determined at block 815 whether the watermark decoder 104 has already estimated and inverted any geometric distortions in the watermarked video 804. If not ("No" at block 815), the method proceeds to block 816. If so ("Yes" at block 815), the first decoding module 802 outputs a null message 817 indicating that watermark detection has failed.

At block 816, the second decoding module 804 estimates one or more geometric distortions of the watermarked video 804 based on pilot signals detected in the watermarked video. The additional decoding module 804 or another module of the watermark decoder 104 may additionally detect the pilot signals prior to estimating the one or more geometric distortions at block 816.

At block 818, the second decoding module 804 inverts the one or more geometric distortions of the watermarked video 805, thereby generating the warped video 808, at which point the method may return to block 810 with the warped video 808 as input, rather than the watermarked video 804.

According to some embodiments, implementing the watermark decoder 104 as illustrated in FIG. 8 so as to execute the method illustrated in FIG. 8 may shift a computational load from the watermarking system 102 to the watermark decoder 104. Whereas encoding speed may be more important than decoding speed in some embodiments, shifting computational load to the watermark decoder 104 may increase a relative speed of the watermarking system 102. Alternately or additionally, decoding may be performed according to the embodiment of FIG. 8 in a multi-thread fashion, with a different thread for each of the decoding modules 802, 804, and/or a different thread for each of the decoding starting points.

Figure 9A:
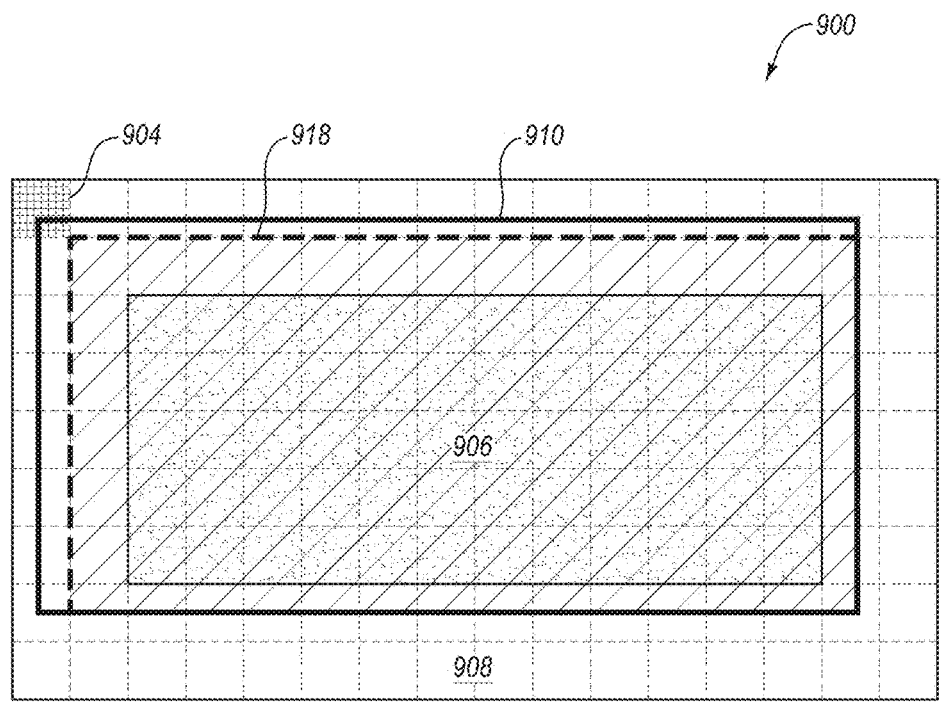
FIG. 9A illustrates a frame of a watermarked video that may be processed by the watermark decoder of FIG. 8 to decode a watermark.
Figure 9B:
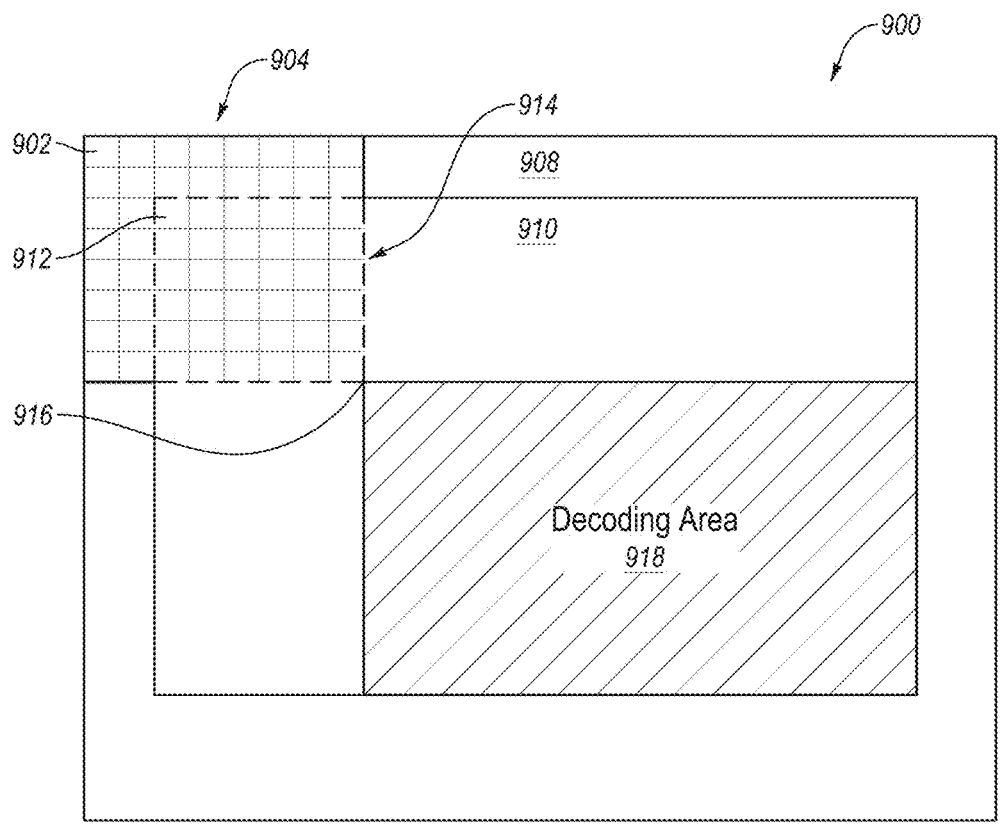
FIG. 9B illustrates a detail view of the frame of FIG. 9A.

FIGS. 9A-9B illustrate a frame 900 of a watermarked video that may be processed by the watermark decoder 104 to decode a watermark, arranged in accordance with at least some embodiments described herein. FIG. 9A illustrates the entire frame 900 and FIG. 9B illustrates a portion thereof. A warped video, such as the warped video 808 of FIG. 8, may include frames that are arranged and processed in a similar manner as the frame 900. In general, the frame 900 is partitioned into multiple 8×8 blocks represented by a grid pattern in FIG. 9A, each block in the grid pattern of FIG. 9A including an 8×8 block.

Because the encoding of the watermark is done on a block basis as described above, the decoding of the watermark may be synchronized with the encoding, meaning the blocks to be decoded at the watermark decoder are aligned with the blocks encoded at the encoder. As described with respect to FIG. 8, decoding starting points are selected and each attempt to decode the watermark begins at one of the decoding starting points. If a decoding starting point is a first pixel in an 8×8 block, synchronization may be achieved and decoding may be successful. If a decoding starting point is not a first pixel in an 8×8 block, there is a misalignment between the encoded blocks and the decoded blocks such that synchronization may not be achieved and the watermark decoder may be unable to decode the watermark from the frame.

In view of the foregoing, if the frame 900 has not been subjected to cropping or shifting, a first pixel 902 (FIG. 9B) of the frame 900 is also a first pixel of an 8×8 block 904 of the frame 902. As such, the first pixel 902 may be used as the decoding starting point to correctly decode the watermark from the frame 900 as the use of the first pixel 902 as the decoding starting point may align all the blocks in the frame 900 with the encoded blocks.

In some embodiments, however, the frame 900 may be subjected to cropping, in which an area 908 is cropped (hereinafter "cropped area 908") from the frame 900, and an area 910 survives (hereinafter "surviving area 910") in the frame 900. As a result of cropping, a first pixel 912 (FIG. 9B) within the surviving area 910 may not be a first pixel of an 8×8 block since a portion of the 8×8 block 904 including the first pixel 912 has been cropped. A similar result may occur as a result of shifting. In either case, using the first pixel 912 as the decoding starting point does not align all the blocks in the surviving area 910 of the frame 900 with corresponding encoded blocks such that decoding the watermark from the frame 900 may fail.

Different pixels within the surviving area 910 may be selected, e.g., as the decoding starting point, until decoding succeeds or all pixels within a search range 914 (FIG. 9B) have been exhausted. The search range 914 may be as large as needed to select a decoding starting point suitable for successful decoding, expanding up to the size of an 8×8 block. In the example of FIG. 9B, the search range 914 includes a 6×6 block of pixels where a last pixel 916 in the search range 914 may be used as the decoding starting point to successfully decode the watermark from the frame 900. Available pixels within the search range 914 that may be selected as decoding starting points may be generically identified as p(x,y), where 0≤x≤7 and 0≤y≤7.

Decoding of the watermark from the frame 900 begins from the decoding starting point in a decoding area 918 within the surviving area 910. The decoding area 918 excludes cropped blocks within the surviving area 910.

Figure 9C:
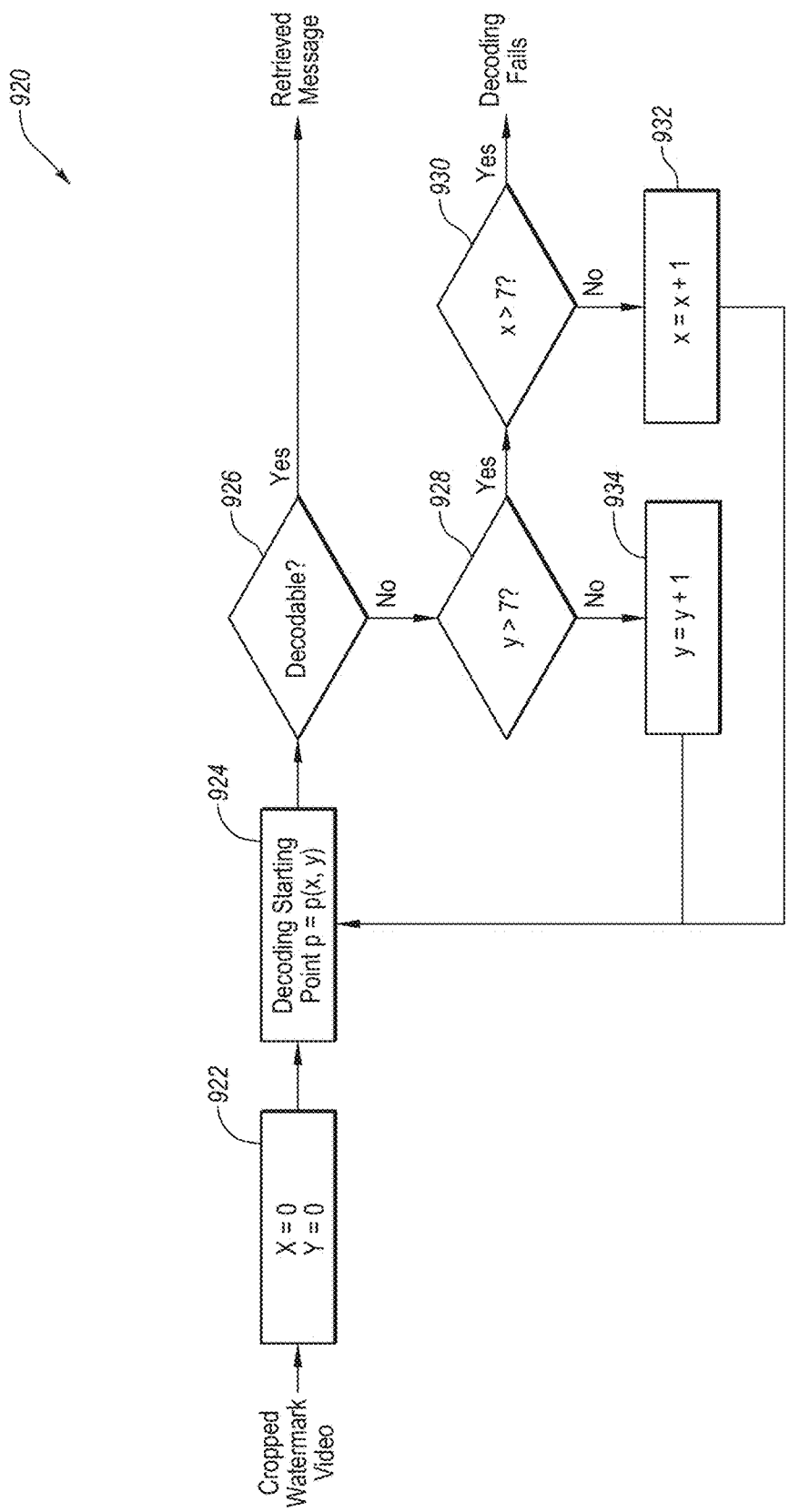
FIG. 9C is a flowchart of an example method of selecting a decoding starting point within a search range.

FIG. 9C is a flowchart of an example method 920 of selecting a decoding starting point within a search range, arranged in accordance with at least some embodiments described herein. The method 920 has some overlap with the method illustrated in FIG. 8. For example, blocks 922, 924, 932, and 934 of FIG. 9C may correspond to block 810 of FIG. 8; block 926 of FIG. 9C may correspond to block 812 of FIG. 8; and blocks 928 and 930 of FIG. 9C may correspond to block 814 of FIG. 8. Although illustrated as discrete blocks, various blocks may be divided into additional blocks, combined into fewer blocks, or eliminated, depending on the desired implementation.

The method 920 may be begin at block 922 in which parameters x and y are initialized at zero. At block 924, a decoding starting point p is initialized as p=p(x,y). At block 926, an attempt is made to decode the video from the decoding starting point p=p(x,y) and to detect the watermark therein. If the attempt is successful ("Yes" at block 926), the watermark is detected and a message is retrieved therefrom.

If the attempt is not successful ("No" at block 926"), the method 920 proceeds to blocks 928 and 930 where it is determined whether a search range for decoding starting points has been exhausted. In some embodiments, for example, it is determined whether y and/or x is/are greater than 7. If both y and x are greater than 7 ("Yes" at block 928 and "Yes" at block 930), then decoding fails. In the event y and/or x is/are not greater than 7 ("No" at block 928 and/or "No" at block 930), y and/or x may be incremented by 1 and the method 920 may return to block 924. The method 920 may repeat until decoding is successful and/or until the search range has been exhausted.

Watermark detection may be conducted on frames of a video, such as a watermarked video or a warped video generated from a watermarked video. For simplicity, watermark detection will be explained with respect to a watermarked video, with the understanding that watermark detection is generally the same for warped video. As explained above, a watermark may include a binary image whose pixel is embedded in a DCT block such that the watermark may be detected on a block basis. For each block of a watermarked frame, its DCT coefficients can be formulated according to equation 1 above. Each side of equation 1 above may be multiplied by the pseudorandom block $B_r(x,y)$ to obtain equation 7:

$$C_w(x,y) \cdot B_r(x,y) = C(x,y) \cdot B_r(x,y) + s_w \cdot W(i,j) \cdot B_r^2(x,y) \cdot JND_w(x,y) \qquad \text{(equation 7)},$$

Summing $C_w(x,y) \cdot B_r(x,y)$ leads to equation 8:

$$\text{sum}(i,j) \approx s_w \cdot W(i,j) \Sigma_{x=0}^{7} \Sigma_{y=0}^{7} JND_w(x,y) \cdot B_r^2(x,y) \qquad \text{(equation 8)},$$

As mentioned above, $s_w$ is watermarking strength and may be non-negative in some embodiments. $JND_w(x,y)$ may also be non-negative. Accordingly, a rule for watermark detection according to some embodiments may be formulated as equations 9 and 10:

$$\dot{W}(i,j) = -1 \text{ if sum}(i,j) < 0 \qquad \text{(equation 9)},$$

$$\dot{W}(i,j) = +1 \text{ if sum}(i,j) \geq 0 \qquad \text{(equation 10)},$$

where $\dot{W}(i,j)$ is a bit of a watermark detected in a block $B(i,j)$ of a frame.

In some embodiments, there is undesirable interference from frame data for watermark detection. To decrease the interference and improve watermark detection, a Wiener filter or other suitable filter may first be used to estimate the watermark-free frame. The watermark-free frame may then be subtracted from the watermarked frame to generate a watermark frame estimate. The watermark may then be detected from the watermark frame estimate as already described with respect to equations 8-10.

Alternately or additionally, the detected watermark may contain noise, such as salt and pepper noise. In these and other embodiments, a median filter may be used to remove the noise to generate a de-noised watermark. The message may be retrieved from the de-noised watermark.

False positives may occur if an incorrect message is retrieved from a detected watermark. Accordingly, some embodiments may fix a length of messages at the encoder such that only retrieval of a message with the fixed length is considered to be successful.

Figure 10A:
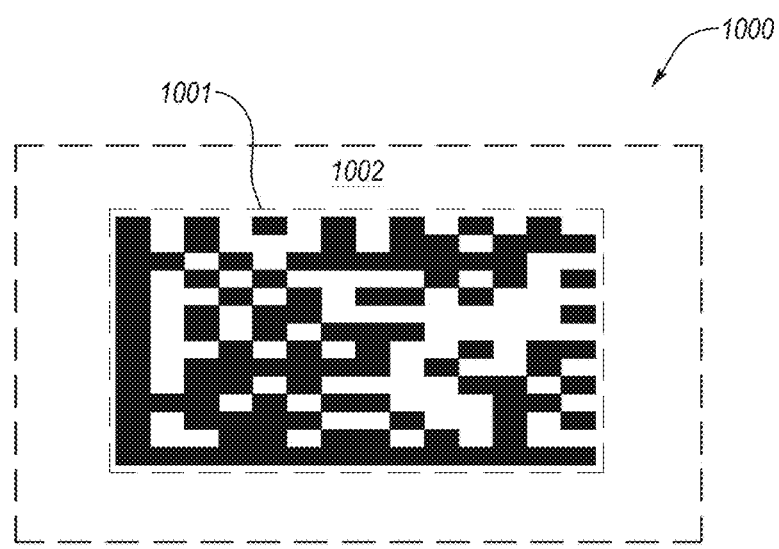
FIG. 10A illustrates a watermark detected in a frame of a video.

FIG. 10A illustrates a watermark 1000 detected in a frame of a video, arranged in accordance with at least some embodiments described herein. In particular, decoding the frame 900 of FIGS. 9A-9B may result in detection of the watermark 1000, which includes both a watermark message zone 1001 and a watermark quiet zone 1002. For example, the watermark message zone 1001 may be detected within the message zone 906 of the frame 900. To the extent the watermark message zone 1001 coincides with the message zone 906, decoding of areas outside the message zone 906 and within the decoding area 918 may produce the watermark quiet zone 1002 which may include some noise, the watermark quiet zone 1002 at least partially surrounding the watermark 1000. The watermark quiet zone 1002 may be ignored when the watermark 1000 is read to retrieve a corresponding message.

Figure 10B:
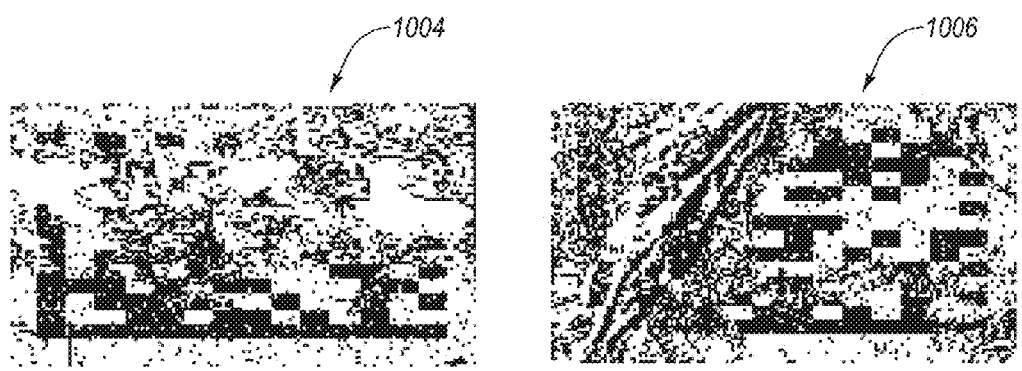
FIG. 10B illustrates a detected watermark from one frame and a detected watermark from another frame.

Sometimes a watermark detected in a frame may be too noisy for message retrieval, even when a Wiener filter and/or a median filter have been used to filter noise. For example, FIG. 10B illustrates a detected watermark 1004 (hereinafter "first detected watermark 1004") from one frame and another detected watermark 1006 (hereinafter "second detected watermark 1006") from a different frame of the same watermarked video, arranged in accordance with at least some embodiments. The first detected watermark 1004 and the second detected watermark 1006 represent the same message but may be too noisy individually to retrieve a corresponding message.

Figure 10C:
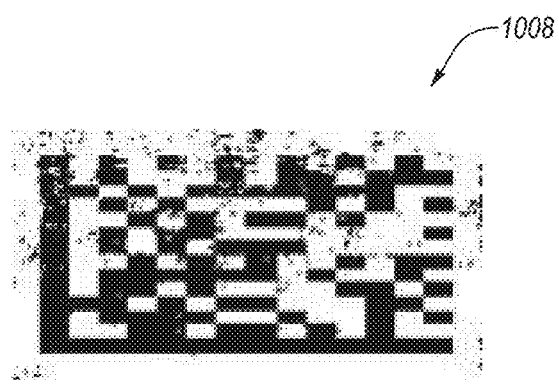
FIG. 10C illustrates an averaged watermark generated by averaging detected watermarks from 69 different frames.

In these and other embodiments, detected watermarks across multiple frames may be averaged to improve message retrieval. For example, FIG. 10C illustrates an averaged watermark 1008 generated by averaging detected watermarks from 69 different frames, arranged in accordance with at least some embodiments described herein. The averaged watermark 1008 represents the same message as the first and second detected watermarks 1004, 1006 of FIG. 10B, and is clean enough for reading and message retrieval.

Figure 11:
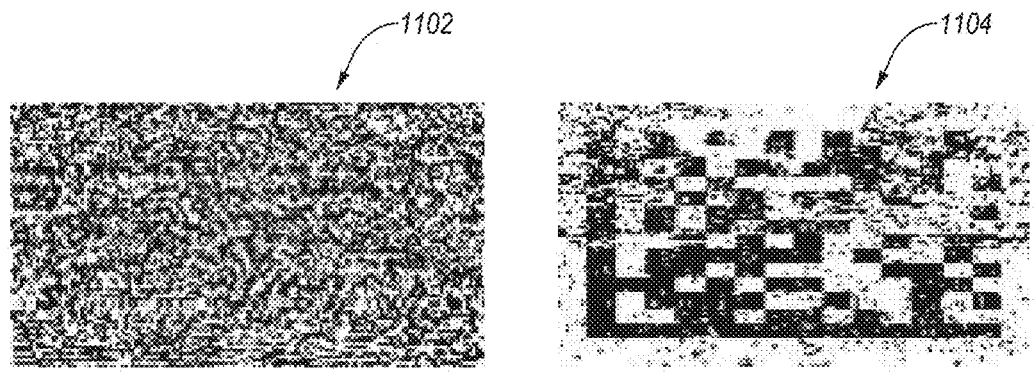
FIG. 11 illustrates a detected watermark from a non-watermarked frame, and a detected watermark from a watermarked frame.

As previously indicated, a watermark may be embedded in some, but not all of the frames of a video. Accordingly, frames without embedded watermarks ("non-watermarked frames") may be excluded from the average. In this regard, FIG. 11 illustrates a detected watermark 1102 from a non-watermarked frame, and a detected watermark 1104 from a frame with an embedded watermark ("watermarked frame"), arranged in accordance with at least some embodiments described. Averaging the detected watermark 1102 with the detected watermark 1104 would make a resulting average watermark noisier, rather than cleaner. Accordingly, some embodiments described herein distinguish between watermarked frames and non-watermarked frames so that only watermarked frames are used in the average.

In more detail, it can be seen from FIG. 11 that detected black and white pixels in the detected watermark 1102 from the non-watermarked frame are, in general, randomly scattered, while detected black and white pixels in the detected watermark 1104 from the watermarked frame are, in general, connected as black or white blocks. Accordingly, an aggregation level A may be calculated which measures how well detected black or white pixels aggregate to blocks. The aggregation level A may be calculated according to equation 11:

$$A = \{\Sigma_{(x,y)=(1,1)}^{(w-1,h-1)} [\Sigma_{(\Delta x, \Delta y)=(-1,-1)}^{(1,1)} C(x+\Delta x, y+\Delta y)]\} / [8 \times (w-2) \times (h-2)] \qquad \text{(equation 11)},$$

where $(\Delta x, \Delta y) \neq (0,0)$, and $C(x+\Delta x, y+\Delta y)$ flags whether a pixel $(x,y)$ is connected to its immediate neighbor $(x+\Delta x, y+\Delta y)$ according to equations 12-13:

$$C(x+\Delta x, y+\Delta y)=1 \text{ if } I(x+\Delta x, y+\Delta y)=I(x,y) \quad \text{(equation 12)},$$

$$C(x+\Delta x, y+\Delta y)=0 \text{ otherwise} \quad \text{(equation 13)}.$$

In equations 11-13, 8 is used because it is a number of immediate neighbors of the pixel $(x,y)$, $I(x,y)$ is intensity of the pixel $(x,y)$, w is a width of the watermark and h is the height of the watermark.

Figure 12A:
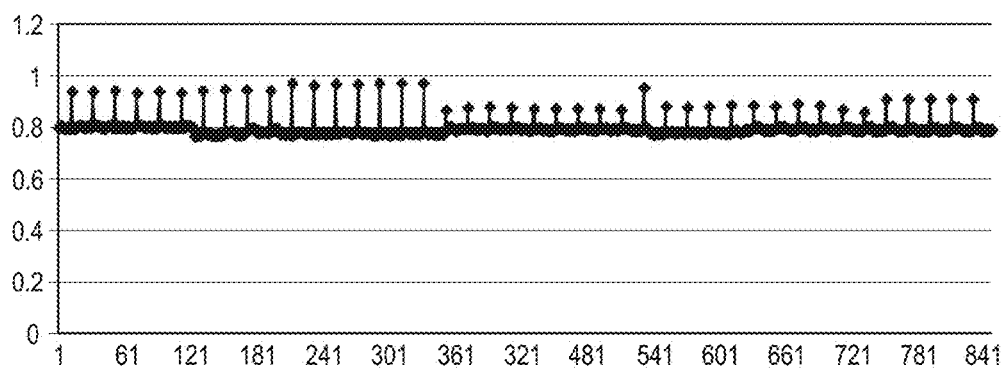
FIG. 12A is a graph of aggregation levels calculated for 850 frames of a video.

FIG. 12A is a graph of aggregation levels calculated according to equations 11-13 for 850 frames of a video, arranged in accordance with at least some embodiments described herein. In FIG. 12A, the vertical axis is the calculated aggregation level and the horizontal axis is the frame number. The aggregation levels A may be used to differentiate watermarked frames from non-watermarked frames.

Alternately or additionally, a local deviation $D(t)$ of aggregation level may be used to differentiate watermarked frames from non-watermarked frames. $D(t)$ may be calculated according to equation 14:

$$D(t)=|A(t)-\hat{A}(t)| \quad \text{(equation 14)},$$

where $\hat{A}(t)$ is a local mean of $A(t)$ and is calculated according to equation 15:

$$\hat{A}(t)=\{\Sigma_{\Delta t=-5}^{5} A(t+\Delta t)\}/11 \quad \text{(equation 15)}.$$

Figure 12B:
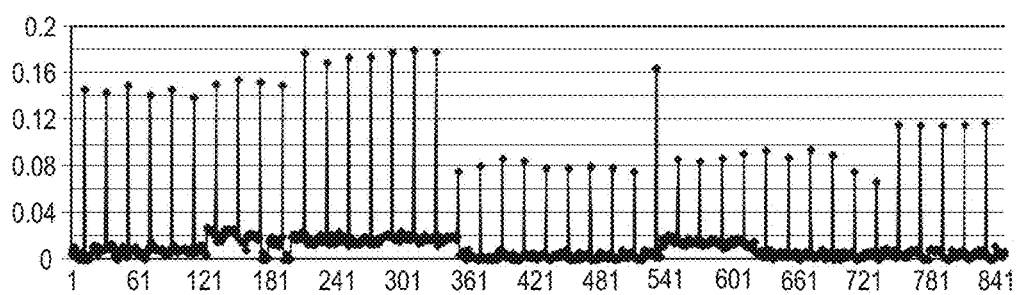
FIG. 12B is a graph of local deviation of aggregation levels for the same 850 frames of video as FIG. 12A.

FIG. 12B is a graph of local deviation $D(t)$ of the aggregation level A for the same 850 frames of video as FIG. 12A, arranged in accordance with at least some embodiments described herein. In FIG. 12B, the vertical axis is the calculated local deviation and the horizontal axis is the frame number. In these and other embodiments, a frame may be flagged as a watermarked frame or a non-watermarked frame according to equations 16-17:

$$F(t)=1 \text{ if } D(t)>6\hat{A}(t) \quad \text{(equation 16)},$$

$$F(t)=0 \text{ otherwise} \quad \text{(equation 17)}.$$

In equations 16-17, a frame is flagged as a watermarked frame (e.g., $F(t)=1$) if $D(t)$ is greater than a threshold $6\hat{A}(t)$, or a non-watermarked frame (e.g., $F(t)=0$) otherwise. Moreover, the threshold $6\hat{A}(t)$ may be selected based on experimentation to be sufficiently large to minimize or completely eliminate false positives.

Figure 12C:
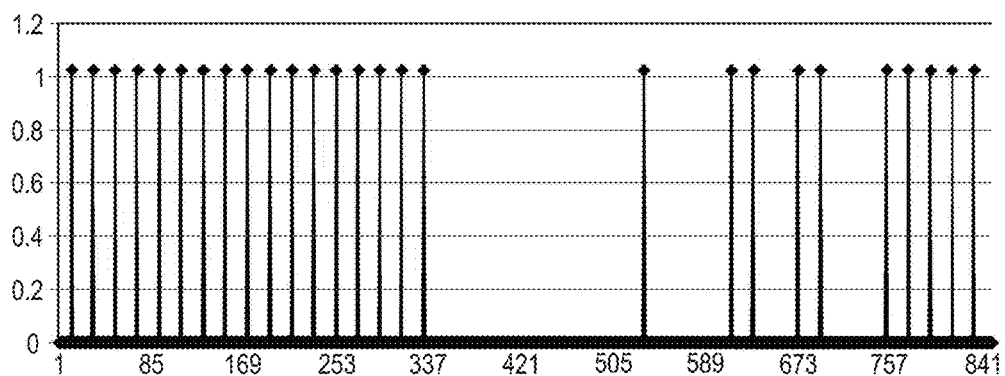
FIG. 12C is a graph of flagged watermarked frames for the same 850 frames of video as FIGS. 12A-12B.

FIG. 12C is a graph of flagged watermarked frames for the same 850 frames of video as FIGS. 12A-12B, arranged in accordance with at least some embodiments described herein. In FIG. 12C, the vertical axis is flagging (0 and 1 are the only possible values) and the horizontal axis is frame number. Of 42 total watermarked frames in the 850 frames of video, 27 are correctly flagged in FIG. 12C and no non-watermarked frames have been incorrectly flagged as being watermarked frames. The 27 flagged watermarked frames are sufficient to construct a clear watermark by averaging as described with respect to FIGS. 10B-10C.

Figure 13:
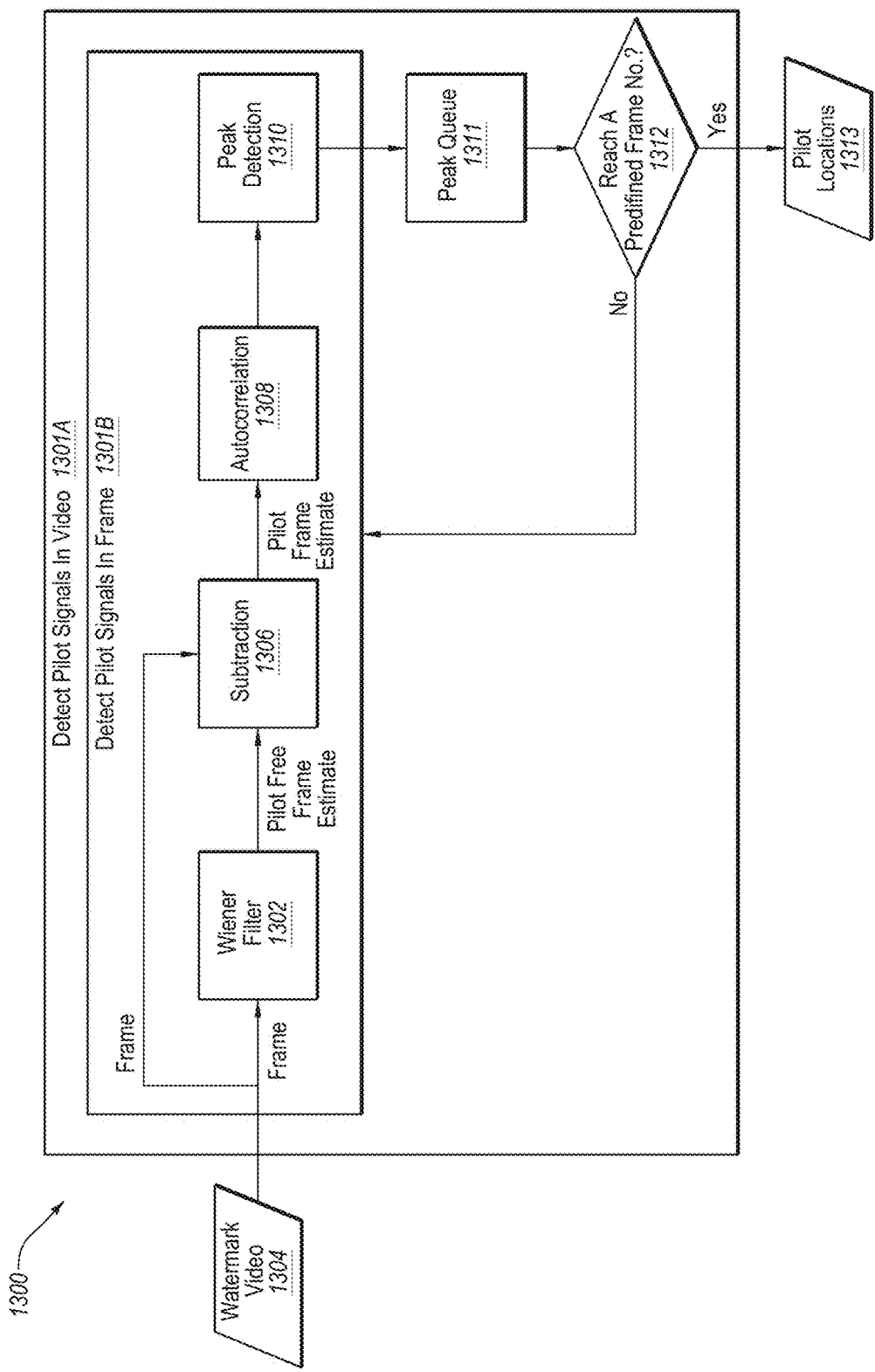
FIG. 13 is a flowchart of an example method of pilot detection.

FIG. 13 is a flowchart of an example method 1300 of pilot detection, arranged in accordance with at least some embodiments described herein. The method 1300 may be implemented, in some embodiments, in the method of FIG. 8 prior to or included as part of block 816. Alternately or additionally, the method 1300 may be implemented by the watermark decoder 104 of FIGS. 1 and/or 8. Although illustrated as discrete blocks, various blocks may be divided into additional blocks, combined into fewer blocks, or eliminated, depending on the desired implementation.

The method 1300 generally includes detecting, at block 1301A, pilot signals in a video, and detecting, at block 1301B, pilot signals in a frame. In more detail, the method 1300 may include, at block 1302, applying a Wiener filter to a frame of a watermarked video 1304 having embedded pilot signals. Application of the Wiener filter may be used to estimate a pilot-free frame. At block 1306, the pilot-free frame may be subtracted from the frame with the pilot signals to generate a pilot frame estimate. At block 1308, an autocorrelation of the pilot frame estimate is generated. At block 1310, peak detection is applied to one or more search areas of the autocorrelation and a peak corresponding to each search area is saved in a peak queue 1311. For example, if peak detection is applied to four search areas of the frame, four peaks may be saved to the peak queue 1311.

At block 1312, it is determined whether all frames or a default or a user-defined number of frames have been searched. If not ("No" at block 1312), the method 1300 returns to block 1301B, where pilot detection is performed on the next frame. If so ("Yes" at block 1312), one peak location 1313 is output for each search area of the autocorrelation. For example, in each of the one or more search areas, the detected peak with the most votes or counts or frequency may be output as the pilot location 1313 for that search area.

Figure 14A:
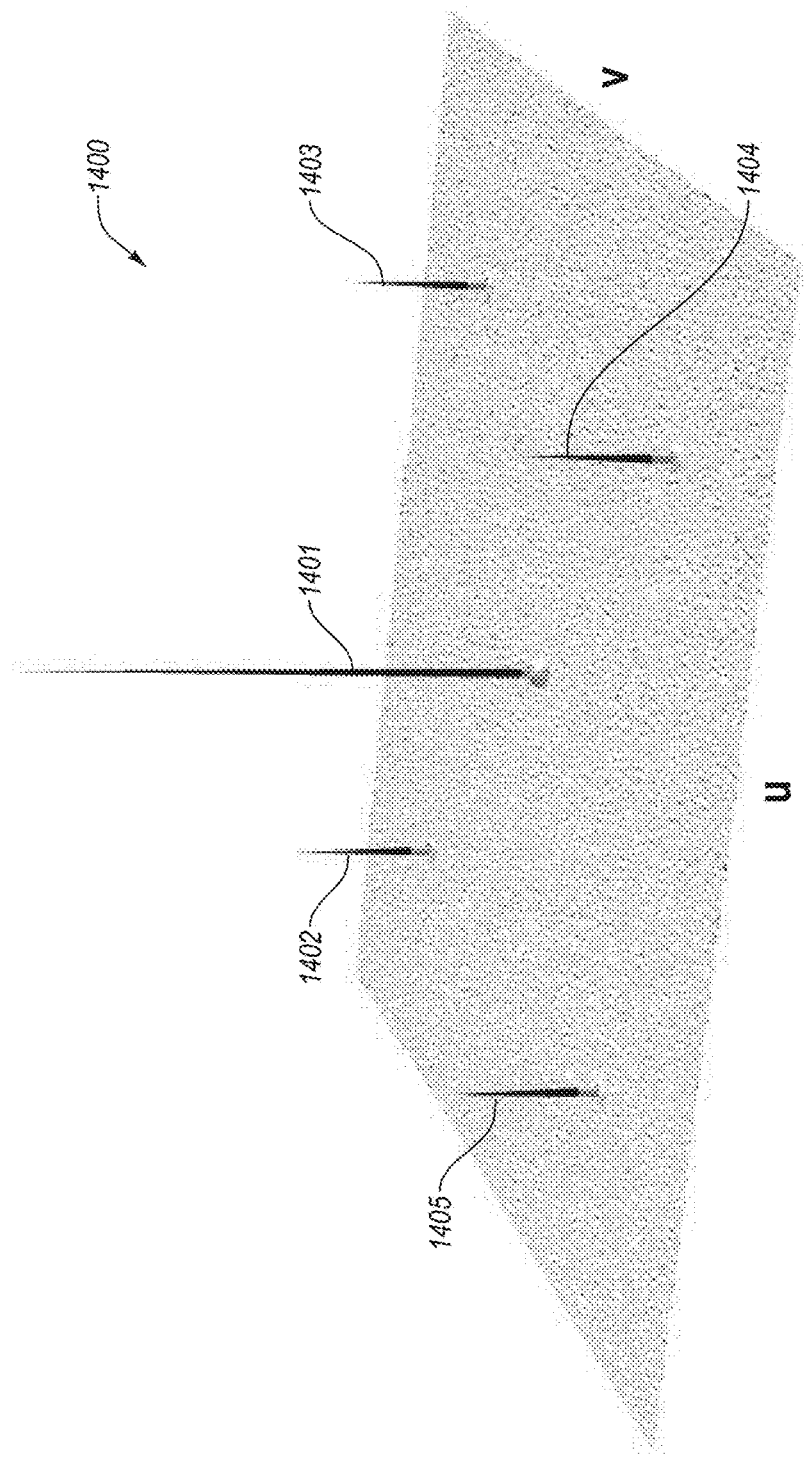
FIG. 14A illustrates an example autocorrelation that may result from a frame of a watermarked video.

FIG. 14A illustrates an example autocorrelation 1400 that may result from a pilot frame estimate of a watermarked video, arranged in accordance with at least some embodiments described herein. Five peaks 1401-1405 are illustrated in FIG. 14A. Where only two pilot signals are embedded per frame as described with respect to FIG. 6C, only two peaks may be expected to occur in the autocorrelation 1400 instead of five. The two peaks may include a peak for pilot0 and a peak for a corresponding one of pilot1-pilot4.

Figure 14B:
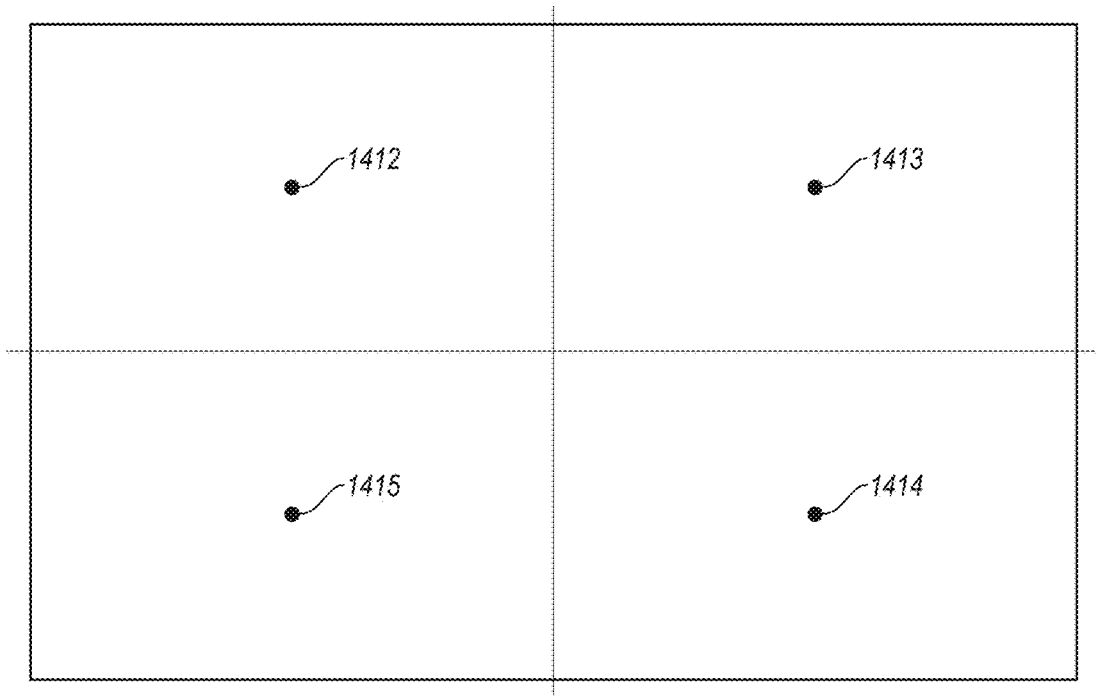
FIG. 14B illustrates locations generated by applying peak detection to the autocorrelation of FIG. 14A.

FIG. 14B illustrates locations 1412-1415 generated by applying peak location to four search areas of the autocorrelation 1400 of FIG. 14A, arranged in accordance with at least some embodiments. The locations 1412-1415 respectively correspond to the peaks 1402-1405.

Figure 14C:
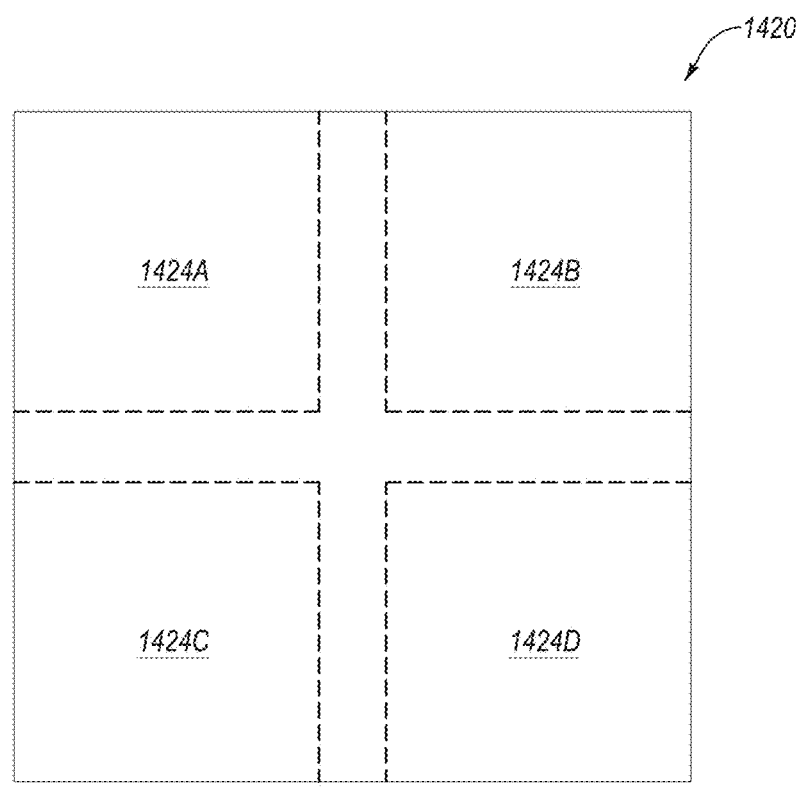
FIG. 14C illustrates search areas of a frame that may be used when performing peak detection.

FIG. 14C illustrates search areas 1422A-1422D (collectively "search areas 1422") of a frame 1420 that may be used when performing peak detection, arranged in accordance with at least some embodiments described herein. The search areas 1422 may be used for locating pilot1-pilot4, of FIGS. 6A-6C. In these and other embodiments, it may be unlikely for pilot1-pilot4 to be located in certain areas of the frame 1420, such as the center of the frame 1420, such that the unlikely areas may be excluded and peak detection may be limited to the search areas 1422 in which it is relatively more likely for pilot1-pilot4 to be found even in the presence of geometric distortions.

The locations generated by peak detection may be accumulated across multiple frames and those peaks and corresponding locations with a relatively higher or highest detection frequency (or highest votes/counts) may be selected as the peaks and locations of the pilot signals. For example, a location generated with a highest detection frequency in each of the search areas 1422 may be selected as the location of the corresponding pilot signal pilot1-pilot4.

According to some embodiments described herein, after pilot signals pilot1-pilot4 in a watermarked video have been detected, one or more geometric distortions of the watermarked video may be estimated. For example, the one or more geometric distortions may be estimated by executing an OpenCV function "getPerspectiveTransform( )." The estimated one or more geometric distortions may then be inverted. In some embodiments, inverting the estimated one or more geometric distortions may include executing an OpenCV "warpPerspective( )." Alternately or additionally, the geometric distortions may be estimated based on the detected pilot signals as a transform M according to equation 18:

$$M = \begin{bmatrix} x_s\cos(\alpha) & -\sin(\alpha) & x_t \\ \sin(\alpha) & y_s\cos(\alpha) & y_t \\ 0 & 0 & 1 \end{bmatrix}, \quad \text{(equation 18)}$$

where $x_s$ and $y_s$ are horizontal and vertical scaling factors, $x_t$ and $y_t$ are horizontal and vertical translations, and $\alpha$ is a rotation angle. In these and other embodiments, the geometric distortions may be inverted to generate a warped video.

Figure 15:
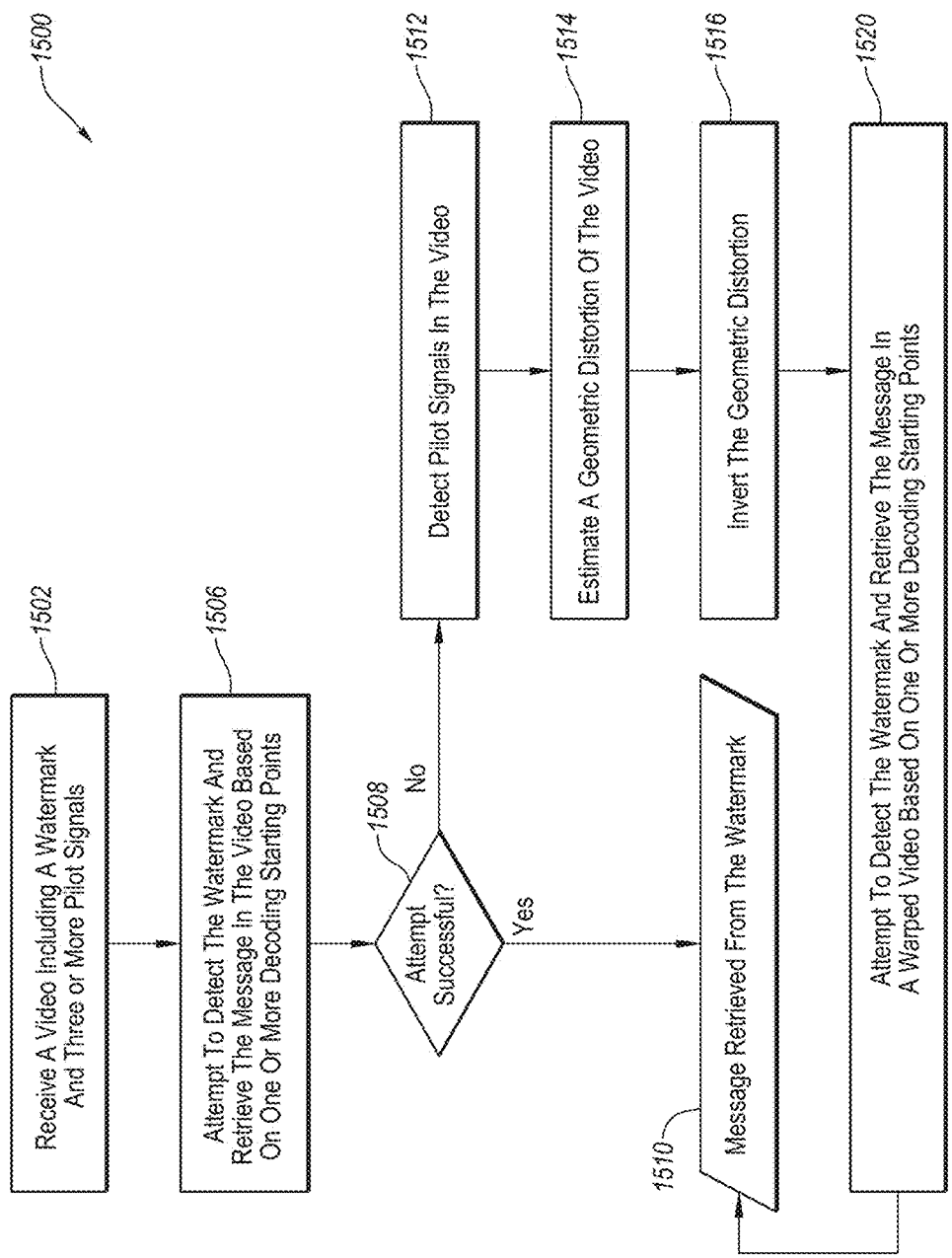
FIG. 15 shows an example flow diagram of a method of decoding a watermarked video.

FIG. 15 shows an example flow diagram of a method 1500 of decoding a watermarked video, arranged in accordance with at least some embodiments described herein. The method 1500 in some embodiments is performed by the watermark decoder 104 and/or by a computer on which the watermark decoder 104 is installed. Although illustrated as discrete blocks, various blocks may be divided into additional blocks, combined into fewer blocks, or eliminated, depending on the desired implementation.

In general, the method 1500 may include attempting to decode a watermark from a frame of a watermarked video and terminating the decoding if the watermark is successfully decoded. If the decoding from the frame fails, the decoding process repeats until it is successful at least one time (e.g., for at least one frame) or until the decoding fails on all frames of the video. If the decoding fails on all frames of the video, an average watermark may be generated from the attempt made on all frames, including identifying watermarked frames and averaging the detected watermarks from the watermarked frames to generate an average watermark as described above with respect to FIGS. 11-12C. If the decoding fails on the average watermark (e.g., if a message cannot be retrieved from the average watermark), the decoding process repeats on another decoding starting point (first attempting to decode the watermark in one or more of the frames, then from an average watermark, if necessary) until it is successful at one decoding starting point or until the decoding fails on all 64 decoding starting points. If the decoding fails at all 64 decoding starting points for the video, the method 1500 may include generating a warped frame and attempting to decode a watermark from the warped frame. The decoding may be terminated if the watermark is successfully decoded from the warped frame. If the decoding from the warped frame fails, another warped frame may be generated and the decoding process repeats until it is successful at least one time (e.g., on at least one warped frame), or until all frames of the video have been warped and decoding has failed. If the decoding fails on all warped frames, an average watermark is generated from the attempt made on all warped frames as described above with respect to FIGS. 11-12C. If the decoding fails on the average watermark generated from all the warped frames, the decoding process repeats on another decoding starting point until it is successful at one decoding starting point or until the decoding fails on all 64 decoding starting points for one or more warped frames.

In more detail, the method 1500 may begin at block 1502 in which a video including a watermark and three or more pilot signals is received.

At block 1506, an attempt is made to detect the watermark and retrieve the message in the video, or more particularly, in one or more frames of the video, based on one or more decoding starting points. Attempting to detect the watermark and retrieve the message in the video based on the one or more decoding starting points may be performed as generally described with respect to FIGS. 8-12C.

At block 1508, it is determined whether the attempt is successful. The attempt may be considered successful based on one or more of: whether a retrieved message has a fixed length equal to the fixed length set at a corresponding watermark encoder, a calculated aggregation level A, a calculated local deviation D(t) of the aggregation level A, comparison of either of the foregoing to a threshold level, or the like or any combination thereof.

If the attempt is successful ("Yes" at block 1508), the method 1500 outputs the message 1510 that is retrieved from the video with the attempt and terminates.

If the attempt is unsuccessful ("No" at block 1508), the method 1500 may proceed to block 1512 in which pilot signals are detected in the video, or more particularly, in one or more frames of the video. Detecting pilot signals in the video may be performed as generally described with respect to FIGS. 13-14C.

At block 1514, and based on the detected pilot signals, one or more geometric distortions of the video may be estimated.

At block 1516, the one or more geometric distortions may be inverted to generate a warped video including at least one frame.

At block 1520, an attempt is made to detect the watermark and retrieve the message in the warped video, or more particularly, in one or more frames of the warped video, based on one or more decoding starting points. Attempting to detect the watermark and retrieve the message in the warped video based on the one or more decoding starting points may be performed as generally described with respect to FIGS. 8-12C.

If the attempt at block 1520 is successful, the method 1500 outputs the message 1510 that is retrieved from the warped video and terminates.

As generally described with respect to FIGS. 9A-9C, the decoding starting points of the video or the warped video may be denoted p(x,y), where $0 \le x \le 7$ and $0 \le y \le 7$. In these and other embodiments, attempting to detect the watermark and retrieve the message in the video or in the warped video at block 1506 or block 1520 may include the following. The frames of the corresponding video or warped video may be partitioned into 8×8 blocks beginning at a corresponding one of the decoding starting points p(x,y). For each of the 8×8 blocks, a watermarking bit is detected from the discrete cosine transform (DCT) coefficients of the corresponding 8×8 block. For each of the frames, a watermark is detected from the 8×8 blocks of the frame. If the message is not retrieved from at least one of the watermarks detected from the frames, the method may additionally include selecting a different one of the decoding starting points p(x,y) and repeating the detection and retrieving algorithm. Or, if the message is retrieved from at least one of the watermarks detected from the frames or the detection and retrieving algorithm has been performed for all of the decoding starting points p(x,y), the detection and retrieving algorithm may be terminated.

Alternately or additionally, attempting to detect the watermark and retrieve the message in the video or in the warped video at block 1506 or 1520 may include: detecting a watermark in each of multiple frames; and averaging the detected watermarks to generate an average watermark. Detecting a watermark in each of multiple frames may include calculating an aggregation level A as described with respect to FIGS. 11-12A, and/or calculating a local deviation D(t) of the aggregation level A as described with respect to FIG. 12B for the multiple frames. Alternately or additionally, detecting a watermark in each of multiple frames may include determining that the aggregation level A and/or the local deviation D(t) for each of the multiple frames is above a threshold, such as the threshold 6Â(t) in equation 16.

Alternately or additionally, the method 1500 may include applying a filter to a frame of the video (or the warped video), the frame including the watermark, to estimate a watermark-free frame. The applied filter may include a Wiener filter in some embodiments. The method 1500 may additionally include subtracting the watermark-free frame from the frame including the watermark to generate a watermark frame estimate. In these and other embodiments, attempting to detect the watermark in the video at block 1506 or in the warped video at block 1520 may include attempting to detect the watermark in the watermark frame estimate.

Alternately or additionally, the detected watermark may contain noise, such as salt and pepper noise. In these and other embodiments, a median filter may be used to remove the noise to generate a de-noised watermark. The message may be retrieved from the de-noised watermark.

In some embodiments, detecting the pilot signals at block 1512 may include the following. An autocorrelation of a frame of the video may be calculated. The autocorrelation may be partitioned into multiple search areas. One or more peaks may be detected in each of the search areas. A single peak in each of the search areas may be identified as one of the pilot signals, where the identified peak for each of the search areas may have a highest detection frequency out of all of the one or more peaks detected in the corresponding one of the search areas.

Alternately or additionally, the method 1500 may further include: applying a filter to a frame of the video, the frame including at least one of the pilot signals, to estimate a pilot-free frame; and subtracting the pilot-free frame from the frame including at least one of the pilot signals to generate a pilot frame estimate. In these and other embodiments, attempting to detect the pilot signals in the video may include attempting to detect the pilot signals in the pilot frame estimate.

Some embodiments described herein include an article of manufacture such as a non-transitory computer-readable medium having computer instructions stored thereon that are executable by a processing device to perform one or more of the operations included in the method 1500 of FIG. 15 and/or variations thereof. The non-transitory computer-readable medium and the processing device may be included in the watermark decoder 104 above and/or in a computer on which the watermark decoder 104 is installed.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of decoding a watermarked video, the method comprising:
receiving a video including a watermark and three or more pilot signals;
attempting to detect the watermark and retrieve a corresponding message in the video based on one or more decoding starting points of the video;
if the attempt is successful, outputting the message; or
if the attempt fails:
detecting the pilot signals in the video;
based on the detected pilot signals, estimating a geometric distortion of the video;
inverting the geometric distortion for the video to generate a warped video; and
attempting to detect the watermark and retrieve the corresponding message in the warped video based on one or more decoding starting points of the warped video.

2. The method of claim 1, wherein:
the decoding starting points of the video or of the warped video are denoted p(x,y), where $0 \leq x \leq 7$ and $0 \leq y \leq 7$; and
attempting to detect the watermark and retrieve the corresponding message in the video or in the warped video comprises performing a detection and retrieving algorithm including:
partitioning frames of the video or warped frames of the warped video into 8×8 blocks beginning at a corresponding one of the decoding starting points p(x,y);

detecting, for each of the 8×8 blocks, a watermarking bit in discrete cosine transform (DCT) coefficients of the corresponding 8×8 block; and one of:

selecting a different one of the decoding starting points p(x,y) and repeating the detection and retrieving algorithm if the message is not retrieved in at least one of the watermarks detected from the frames or the warped frames; or terminating the detection and retrieving algorithm if the message is retrieved from at least one of the watermarks detected from the frames or the warped frames or if the detection and retrieving algorithm has been performed for all of the decoding starting points p(x,y).

3. The method of claim 1, wherein attempting to detect the watermark in the video or in the warped video comprises:

detecting a watermark in each of a plurality of frames of the video or the warped video; and averaging the detected watermarks to generate an average watermark.

4. The method of claim 3, wherein detecting a watermark in each of the plurality of frames comprises, for each of the plurality of frames:

calculating an aggregation level A indicating an extent to which detected black and white pixels in the frame aggregate to blocks;

calculating a local deviation D(t) of the aggregation level A;

determining that the local deviation D(t) exceeds a selected threshold; and in response to the determination that the local deviation D(t) exceeds a selected threshold, flagging the frame as a watermarked frame wherein at least some of the detected black and white pixels collectively form the detected watermark.

5. The method of claim 1, further comprising:

applying a Wiener filter to the frame of the video, the frame including the watermark, to estimate a watermark-free frame; and subtracting the watermark-free frame from the frame to generate a watermark frame estimate;

wherein attempting to detect the watermark in the video comprises attempting to detect the watermark in the watermark frame estimate.

6. The method of claim 1, further comprising applying a median filter to the detected watermark to generate a de-noised watermark, wherein retrieving a message from the detected watermark includes retrieving the message from the de-noised watermark.

7. The method of claim 1, wherein detecting the pilot signals comprises:

calculating an autocorrelation of each frame of the video;

dividing each autocorrelation into a plurality of search areas;

for each autocorrelation, detecting a peak in each of the plurality of search areas; and across all of the autocorrelations, identifying a single peak in each of the plurality of search areas as a corresponding one of the three or more pilot signals, the identified peak for each of the plurality of search areas having a highest detection frequency out of all of the one or more peaks detected in the corresponding one of the plurality of search areas across all of the autocorrelations.

8. The method of claim 1, further comprising:

applying a filter to a frame of the video, the frame including at least one of the pilot signals, to estimate a pilot-free frame; and subtracting the pilot-free frame from the frame including at least one of the pilot signals to generate a pilot frame estimate;

wherein attempting to detect the pilot signals in the video comprises attempting to detect the pilot signals in the pilot frame estimate.

9. The method of claim 1, wherein:

estimating a geometric distortion of the video comprises executing an OpenCV function "getPerspectiveTransform( );" and inverting the geometric distortion comprises executing an OpenCV function "warpPerspective( )".

10. A non-transitory computer-readable medium having computer instructions stored thereon that are executable by a processing device to perform operations to decode a watermarked video, the operations comprising:

receiving a video including a watermark and three or more pilot signals;

attempting to detect the watermark and retrieve a corresponding message in the video based on one or more decoding starting points of the video;

if the attempt is successful, outputting the message; or if the attempt fails:

detecting the pilot signals in the video;

based on the detected pilot signals, estimating a geometric distortion of the video;

inverting the geometric distortion for the video to generate a warped video; and attempting to detect the watermark and retrieve the corresponding message in the warped video based on one or more decoding starting points of the warped video.

11. The non-transitory computer-readable medium of claim 10, wherein:

the decoding starting points of the video or of the warped video are denoted p(x,y), where $0 \leq x \leq 7$ and $0 \leq y \leq 7$; and attempting to detect the watermark and retrieve the corresponding message in the video or in the warped video comprises performing a detection and retrieving algorithm including:

partitioning frames of the video or warped frames of the warped video into 8×8 blocks beginning at a corresponding one of the decoding starting points p(x,y);

detecting, for each of the 8×8 blocks, a watermarking bit in discrete cosine transform (DCT) coefficients of the corresponding 8×8 block; and one of:

selecting a different one of the decoding starting points p(x,y) and repeating the detection and retrieving algorithm if the message is not retrieved in at least one of the watermarks detected from the frames or the warped frames; or terminating the detection and retrieving algorithm if the message is retrieved from at least one of the watermarks detected from the frames or the warped frames or if the detection and retrieving algorithm has been performed for all of the decoding starting points p(x,y).

12. The non-transitory computer-readable medium of claim 10, wherein attempting to detect the watermark in the video or in the warped video comprises:

detecting a watermark in each of a plurality of frames of the video or the warped video; and averaging the detected watermarks to generate an average watermark.

13. The non-transitory computer-readable medium of claim 12, wherein detecting a watermark in each of the plurality of frames comprises, for each of the plurality of frames:

calculating an aggregation level A indicating an extent to which detected black and white pixels in the frame aggregate to blocks;

calculating a local deviation D(t) of the aggregation level A;

determining that the local deviation D(t) exceeds a selected threshold; and in response to the determination that the local deviation D(t) exceeds a selected threshold, flagging the frame as a watermarked frame wherein at least some of the detected black and white pixels collectively form the detected watermark.

14. The non-transitory computer-readable medium of claim 10, further comprising:

applying a Wiener filter to the frame of the video, the frame including the watermark, to estimate a watermark-free frame; and subtracting the watermark-free frame from the frame to generate a watermark frame estimate;

wherein attempting to detect the watermark in the video comprises attempting to detect the watermark in the watermark frame estimate.

15. The non-transitory computer-readable medium of claim 10, further comprising applying a median filter to the detected watermark to generate a de-noised watermark, wherein retrieving a message from the detected watermark includes retrieving the message from the de-noised watermark.

16. The non-transitory computer-readable medium of claim 10, wherein detecting the pilot signals comprises:

calculating an autocorrelation of each frame of the video;

dividing each autocorrelation into a plurality of search areas;

for each autocorrelation, detecting a peak in each of the plurality of search areas; and across all of the autocorrelations, identifying a single peak in each of the plurality of search areas as a corresponding one of the three or more pilot signals, the identified peak for each of the plurality of search areas having a highest detection frequency out of all of the one or more peaks detected in the corresponding one of the plurality of search areas across all of the autocorrelations.

17. The non-transitory computer-readable medium of claim 10, further comprising:

applying a filter to a frame of the video, the frame including at least one of the pilot signals, to estimate a pilot-free frame; and subtracting the pilot-free frame from the frame including at least one of the pilot signals to generate a pilot frame estimate;

wherein attempting to detect the pilot signals in the video comprises attempting to detect the pilot signals in the pilot frame estimate.

18. The non-transitory computer-readable medium of claim 10, wherein:

estimating a geometric distortion of the video comprises executing an OpenCV function "getPerspectiveTransform( );" and inverting the geometric distortion comprises executing an OpenCV function "warpPerspective( )".

19. The method of claim 1, wherein:

the decoding starting points of the video or of the warped video are denoted p(x,y); and attempting to detect the watermark and retrieve the corresponding message in the video or in the warped video comprises performing a detection and retrieving algorithm including:

partitioning frames of the video or warped frames of the warped video into a plurality of blocks beginning at a corresponding one of the decoding starting points p(x,Y);

detecting, for each of the plurality of blocks, a watermarking bit in one or more coefficients of the corresponding block; and one of:

selecting a different one of the decoding starting points p(x,y) and repeating the detection and retrieving algorithm if the message is not retrieved in at least one of the watermarks detected from the frames or the warped frames; or terminating the detection and retrieving algorithm if the message is retrieved from at least one of the watermarks detected from the frames or the warped frames or if the detection and retrieving algorithm has been performed for all of the decoding starting points p(x,y).

20. The method of claim 1, wherein attempting to detect the watermark in the video or in the warped video comprises:

calculating an aggregation level A indicating an extent to which detected black and white pixels in the frame aggregate to blocks;

calculating a local deviation D(t) of the aggregation level A;

determining that the local deviation D(t) exceeds a selected threshold; and in response to the determination that the local deviation D(t) exceeds a selected threshold, flagging the frame as a watermarked frame wherein at least some of the detected black and white pixels collectively form the detected watermark.

* * * * *